US012585649B2

(12) United States Patent
Gjerdrum et al.

(10) Patent No.: US 12,585,649 B2
(45) Date of Patent: Mar. 24, 2026

(54) CONDITIONAL BRANCHING FOR A FEDERATED GRAPH QUERY PLAN

(71) Applicant: Microsoft Technology Licensing, LLC, Redmond, WA (US)

(72) Inventors: Anders Tungeland Gjerdrum, Tromso (NO); Johannes Cornelis Draaijer, Tromso (NO)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 18/671,967

(22) Filed: May 22, 2024

(65) Prior Publication Data

US 2025/0363110 A1 Nov. 27, 2025

(51) Int. Cl.
*G06F 16/2453* (2019.01)
*G06F 16/25* (2019.01)

(52) U.S. Cl.
CPC .. *G06F 16/24542* (2019.01); *G06F 16/24539* (2019.01); *G06F 16/256* (2019.01)

(58) Field of Classification Search
None
See application file for complete search history.

(56) References Cited

U.S. PATENT DOCUMENTS

| | | | |
|---|---|---|---|
| 8,626,744 | B2 | 1/2014 | Cheng |
| 9,292,570 | B2 | 3/2016 | Sargeant |
| 10,303,567 | B2 * | 5/2019 | Finnerty ............. G06F 11/1461 |
| 11,321,317 | B2 | 5/2022 | Su |
| 11,321,330 | B1 * | 5/2022 | Pandis ................ G06F 16/2471 |
| 11,416,486 | B2 | 8/2022 | Arnold |
| 2004/0249683 | A1 * | 12/2004 | Demarcken ............ G06Q 10/02 |
| | | | 705/5 |
| 2007/0226186 | A1 | 9/2007 | Ewen |
| 2011/0072006 | A1 * | 3/2011 | Yu ..................... G06F 16/24535 |
| | | | 707/718 |
| 2013/0086039 | A1 * | 4/2013 | Salch .................. G06F 16/2455 |
| | | | 707/E17.131 |
| 2015/0026692 | A1 | 1/2015 | Ghosh |

(Continued)

OTHER PUBLICATIONS

Abdelaziz, et al., "Query Optimizations Over Decentralized RDF Graphs", In IEEE 33rd International Conference on Data Engineering, 2017, 4 pages.

(Continued)

*Primary Examiner* — Giuseppi Giuliani
(74) *Attorney, Agent, or Firm* — Barta Jones, PLLC

(57) ABSTRACT

Example solutions for optimizing an initial query execution plan for a federated database includes identifying a group of operations in the initial query execution plan that conform to a recognized pattern including fetching data from a data store. Based on detection of the pattern and of the presence of a condition, an optimized query execution plan is created from the initial query execution plan by replacing the group of operations with a first execution branch and a second execution branch, wherein the optimized query execution plan executes at least one of the first and second execution branches. The first execution branch includes first operations for fetching the data from a first data store and the second execution branch comprise second operations for fetching at least a subset of the data from a second data store.

20 Claims, 21 Drawing Sheets

(56) References Cited

U.S. PATENT DOCUMENTS

| | | | | |
|---|---|---|---|---|
| 2016/0364447 | A1* | 12/2016 | Chen | ................... G06F 16/2453 |
| 2018/0024928 | A1* | 1/2018 | Hassan | .............. G06F 11/3457 |
| | | | | 711/118 |
| 2019/0065549 | A1* | 2/2019 | Pang | ................... G06F 16/2272 |
| 2022/0004551 | A1* | 1/2022 | Ghazal | ............... G06F 16/2255 |
| 2023/0195729 | A1 | 6/2023 | Sebastian | |

OTHER PUBLICATIONS

Bowman, Andrew., "Conditional Cypher Execution", accessed on link https://neo4j.com/developer/kb/conditional-cypher-execution/, Retrieved on Apr. 11, 2024, 9 pages.

Hose, et al., "Database Foundation to Scalable RDF Processing", Reasoning Web. Semantic Technologies for the Web of Data, Aug. 23, 2011, pp. 202-249.

International Search Report and Written Opinion recieved for PCT Application No. PCT/US2025/017113, mailed on May 8, 2025. 13 pages.

Zhao, et al., "QueryFormer: A Tree Transformer Model for Query Plan Representation." Proceedings of the VLDB Endowment, vol. 15, Issue No. 8, Apr. 1, 2022, pp. 1658-1670.

* cited by examiner

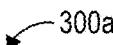
300a

| NODE SUB-SCHEMA   121 | |
|---|---|
| Field Name | Description |
| ID | The principal ID (external ID) of the node |
| Properties | A set of properties available on the node that may be referenced to express filtering, ordering, or other parameters, or returned in the response payload |
| Provenance | Describes the origin and availability of the node, such as in which storage systems the node is found, which should be considered the authoritative source, which are considered caches, and/or freshness information |

FIG. 3B

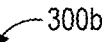
300b

| RELATIONSHIP SUB-SCHEMA   122 | |
|---|---|
| Source Node ID | The ID of the node from which the relationship is outbound |
| Target Node ID | The ID of the node to which the relationship is inbound |
| Properties | A set of available relationship properties – similar uses as node properties |
| Type | The type of relationship |

FIG. 3C

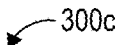
300c

| PROPERTY SUB-SCHEMA   123 | |
|---|---|
| Property Name | A string that uniquely identifies the property in the global schema |
| Type | The type of the property, such as string, integer, byte |
| Data Classification | The classification of the property, indicating sensitivity or dissemination limits |
| Provenance | Describes the origin and availability of the property, such as in which storage systems the property is found, which should be considered the authoritative source, which are considered caches, and/or freshness information |

FIG. 3D

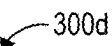
300d

| DATA STORE SUB-SCHEMA | 124 |
|---|---|
| Store ID | A unique identifier of the data store |
| Store Name | A label for the data store intended for human interpretation |
| Capabilities | Identification of query search capabilities supported by the data store |

FIG. 4A

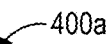
400a

| PRINCIPAL ID SUB-SCHEMA | 125 |
|---|---|
| Data Classification | The classification of this ID, indicating sensitivity or dissemination limits |
| Value | A unique identifier of an entity within the global arrangement |

FIG. 4B

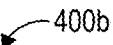
400b

| REFERENCE ID SUB-SCHEMA | 126 |
|---|---|
| Data Classification | The classification of this ID, indicating sensitivity or dissemination limits |
| Region ID | An identification of the logical region in which an entity is located |
| System ID | An identification of the target system in which an entity is located |
| Value | A unique identifier within a specific target system and region pair |

QUERY: MATCH (user) WHERE id(user) = "userId"
RETURN user.Name, user.EmailAddress

SCHEMA:

| Property Name | Type | DataClassification | Provenance |
|---|---|---|---|
| User.Name | String | EU protected PII | [{"StoreName","StoreA", "AuthoritativeSource": "true"}, {"StoreName","StoreB", "AuthoritativeSource": "false"}] |
| User.EmailAddress | String | EU protected PII | [{"StoreName","StoreA", "AuthoritativeSource": "true"}] |

QUERY: MATCH (user)-[r:Messaged]->(friend) WHERE id(user) = "userId"
RETURN user.Name, friend.Name

SCHEMA:

| Property Name | Type | Properties | Provenance |
|---|---|---|---|
| User.Name | String | EU protected PII | [{"StoreName","StoreA", " AuthoritativeSource": "true"}, {"StoreName","StoreB", "AuthoritativeSource": "false"}] |

| SourceNodeID | TargetNodeID | Properties | DefaultSortValue | Type | Provenance |
|---|---|---|---|---|---|
| User.ID | User.ID | ["Message.PropA", "Message.PropB", "MessageTime"] | MessageTime | Messaged | [{"StoreName","StoreB", "IsBackingStore": "true"}] |

QUERY:

```
MATCH (user)-[r:Modified]->(document)
WHERE id(user) = "userId" AND document.Title = "Status Update"
RETURN user.Name, document.Title
```

SCHEMA:

| Property Name | Type | DataClassification | Provenance |
|---|---|---|---|
| User.Name | String | EU protected PII | [{"StoreName":"StoreA", "AuthoritativeSource": "true"}, {"StoreName":"StoreB", "AuthoritativeSource": "false"}] |
| Document.Title | String | Customer Content | [{"StoreName":"StoreA", "AuthoritativeSource": "true"}, {"StoreName":"StoreB", "AuthoritativeSource": "false"}] |

| SourceNodeID | TargetNodeID | Properties | DefaultSortValue | Type | Provenance |
|---|---|---|---|---|---|
| User.ID | User.ID | ["Message.PropA", "Message.PropB", "MessageTime"] | MessageTime | Modified | [{"StoreName":"StoreA", "IsBackingStore":"false"}, {"StoreName":"StoreB", "IsBackingStore": "true"}] |

| StoreID | StoreName | Freshness | Capabilities |
|---|---|---|---|
| GUID_A | StoreA | < 5 minutes | ["NodeLookupById", "EdgeTraversal"] |
| GUID_B | StoreB | < 24 hours | ["NodeLookupById", "EdgeTraversal", "LookupNodeByPropertySearchExactMatch"] |

FIG. 5D

QUERY: MATCH (user)-[r:Modified]->(document)
WHERE id(user) = "userId" AND document.Title = "Status Update"
RETURN user.Name, document.Title ~500d

SCHEMA:

| Property Name | Type | DataClassification | Provenance |
|---|---|---|---|
| User.Name | String | EU protected PII | [{"StoreName":"StoreA", "AuthoritativeSource": "true"}, {"StoreName":"StoreB", "AuthoritativeSource": "false"}] |
| Document.Title | String | Customer Content | [{"StoreName":"StoreA", "AuthoritativeSource": "true"}] |

| SourceNodeID | TargetNodeID | Properties | DefaultSortValue | Type | Provenance |
|---|---|---|---|---|---|
| User.ID | User.ID | ["Message.PropA", "Message.PropB", "MessageTime"] | MessageTime | Modified | [{"StoreName":"StoreA", "IsBackingStore":"false"}, {"StoreName":"StoreB", "IsBackingStore":"true"}] |

| StoreID | StoreName | Freshness | Capabilities |
|---|---|---|---|
| GUID_A | StoreA | < 5 minutes | ["NodeLookupById", "EdgeTraversal", "LookupNodeByPropertySearchExactMatch"] |
| GUID_B | StoreB | < 24 hours | ["NodeLookupById", "EdgeTraversal", "LookupNodeByPropertySearchExactMatch"] |

Figures 5E, 5F:
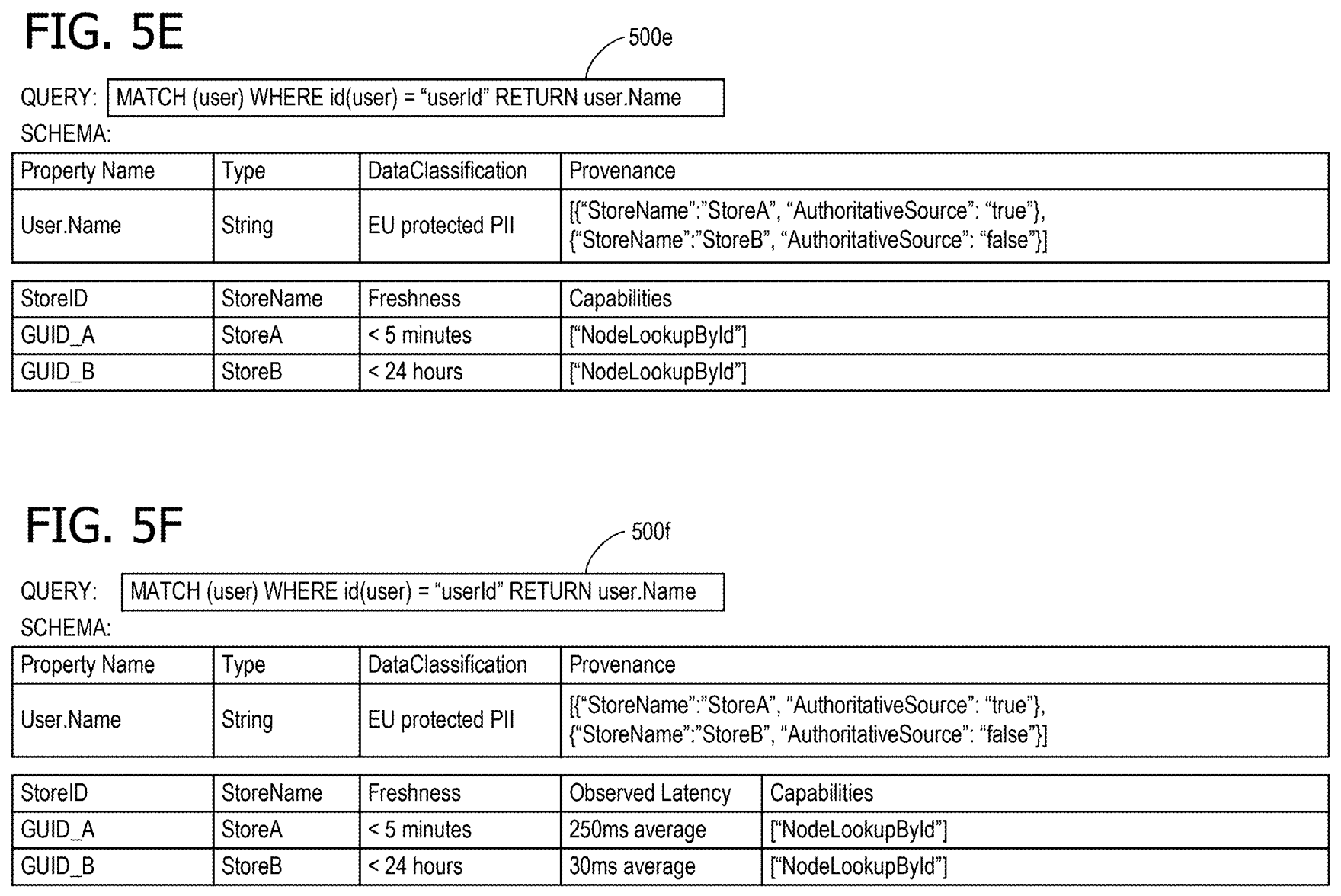

QUERY: MATCH (user) WHERE id(user) = "userId" RETURN user.Name

SCHEMA:

| Property Name | Type | DataClassification | Provenance |
|---|---|---|---|
| User.Name | String | EU protected PII | [{"StoreName":"StoreA", "AuthoritativeSource": "true"}, {"StoreName":"StoreB", "AuthoritativeSource": "false"}] |

| StoreID | StoreName | Freshness | Capabilities |
|---|---|---|---|
| GUID_A | StoreA | < 5 minutes | ["NodeLookupById"] |
| GUID_B | StoreB | < 24 hours | ["NodeLookupById"] |

QUERY: MATCH (user) WHERE id(user) = "userId" RETURN user.Name

SCHEMA:

| Property Name | Type | DataClassification | Provenance |
|---|---|---|---|
| User.Name | String | EU protected PII | [{"StoreName":"StoreA", "AuthoritativeSource": "true"}, {"StoreName":"StoreB", "AuthoritativeSource": "false"}] |

| StoreID | StoreName | Freshness | Observed Latency | Capabilities |
|---|---|---|---|---|
| GUID_A | StoreA | < 5 minutes | 250ms average | ["NodeLookupById"] |
| GUID_B | StoreB | < 24 hours | 30ms average | ["NodeLookupById"] |

Figure 7:
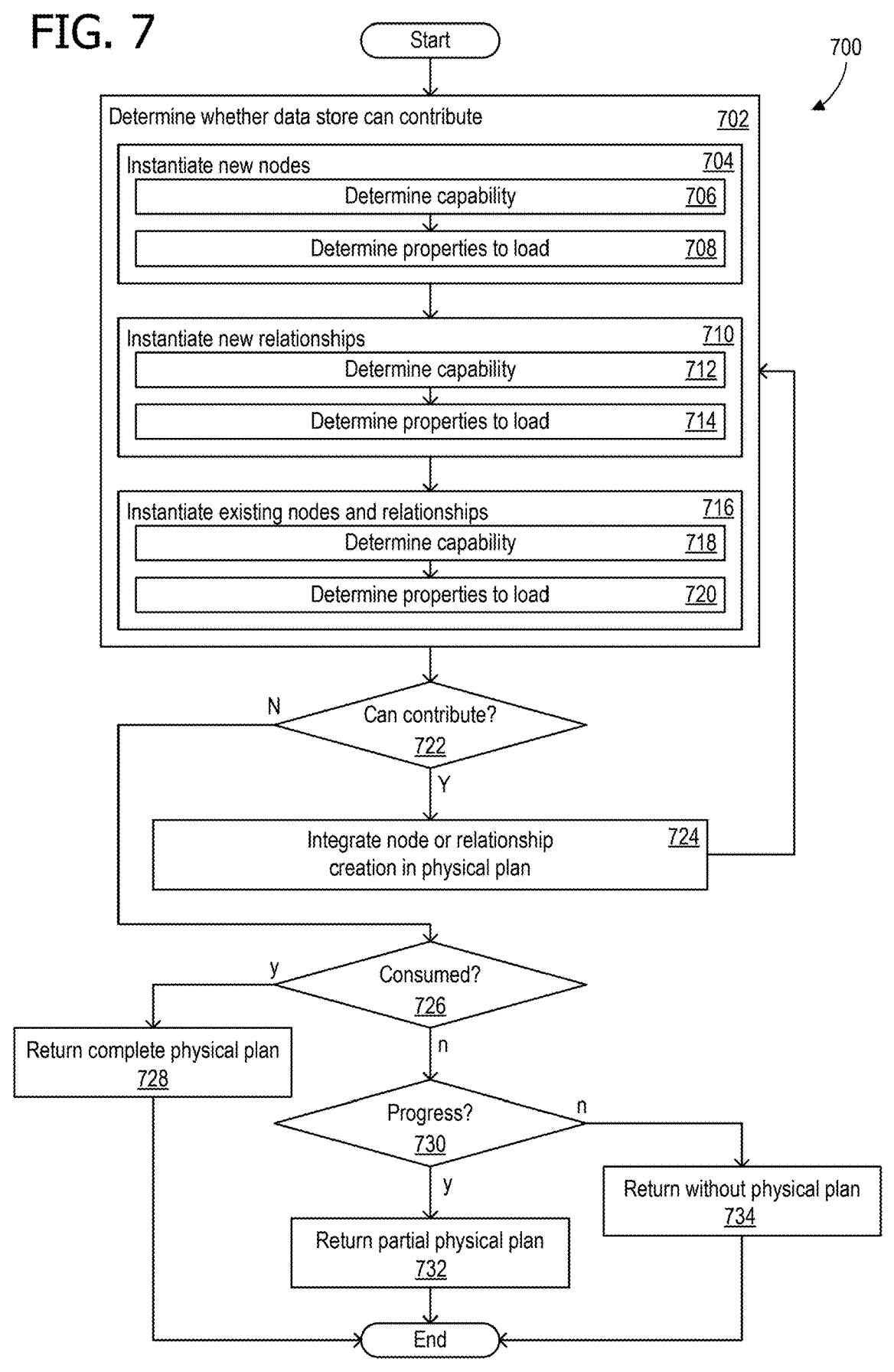

Start

Determine whether data store can contribute                                      702

Instantiate new nodes                                                            704

Determine capability                                                             706

Determine properties to load                                                     708

Instantiate new relationships                                                    710

Determine capability                                                             712

Determine properties to load                                                     714

Instantiate existing nodes and relationships                                     716

Determine capability                                                             718

Determine properties to load                                                     720

N        Can contribute?
                722

Y

Integrate node or relationship
creation in physical plan                                                        724

Consumed?
                726 y

Return complete physical plan
728 n

Progress?
                730        n y

Return without physical plan
734

Return partial physical plan
732

End

900

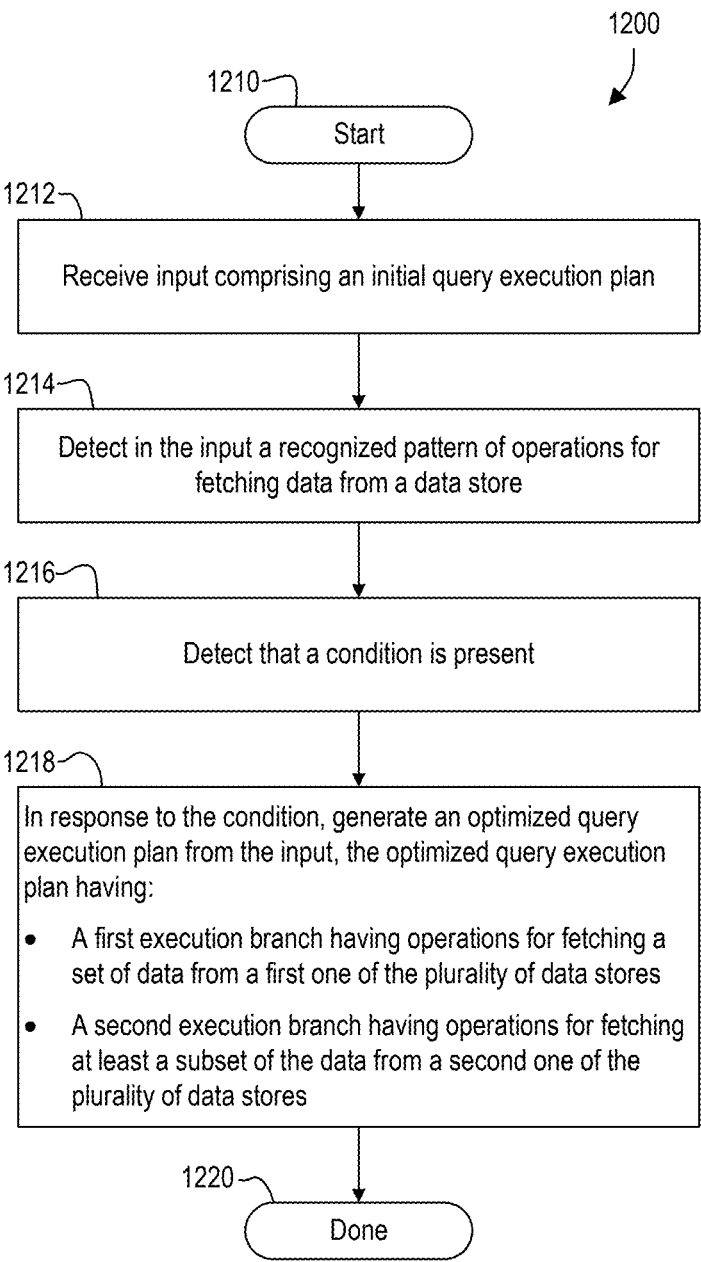

1200

1210

Start

1212

Receive input comprising an initial query execution plan

1214

Detect in the input a recognized pattern of operations for fetching data from a data store

1216

Detect that a condition is present

1218

In response to the condition, generate an optimized query execution plan from the input, the optimized query execution plan having:

- A first execution branch having operations for fetching a set of data from a first one of the plurality of data stores

- A second execution branch having operations for fetching at least a subset of the data from a second one of the plurality of data stores

1220

Done

Figure 17:
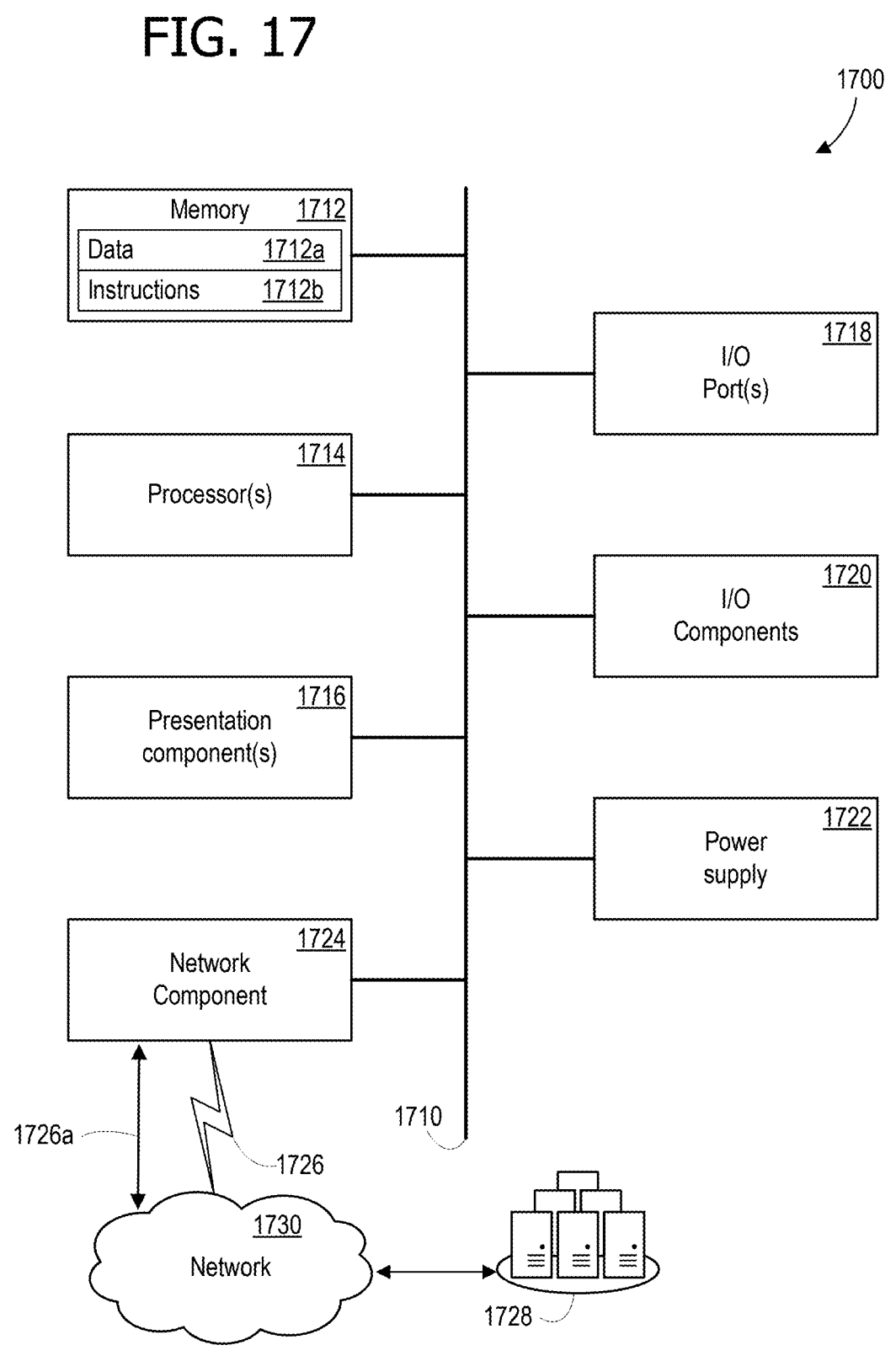

| Memory | 1712 |
|---|---|
| Data | 1712a |
| Instructions | 1712b |

1718
I/O
Port(s)

1714
Processor(s)

1720
I/O
Components

1716
Presentation
component(s)

1722
Power
supply

1724
Network
Component

1710

1726a

1726

1730
Network

1728

CONDITIONAL BRANCHING FOR A FEDERATED GRAPH QUERY PLAN

BACKGROUND

A query planner converts a parsed query into a query execution plan which can then be interpreted by a database runtime engine. The query planner performs multiple discrete successive steps of refinement of the query execution plan, starting with a naïve plan, then iteratively improving it to arrive at a final plan. Multiple different plans can be generated and a lowest cost plan, in terms of resource expenditure, can be selected.

In a federated data storage system, a query is executed by accessing a plurality of data stores hosted on multiple different physical storage systems distributed across multiple geographical regions. The different physical storage systems can provide their hosted data stores with widely different capabilities and characteristics. While there can be overlap in the data itself that is stored in the different data stores, a particular data query can include subqueries directed to data stored in multiple different data stores.

In this context, network bandwidth available to query and retrieve potentially large datasets from distributed data stores is generally limited, and each data store has uncorrelated reliability such that certain data stores might be unavailable while other data stores, having overlapping data, are available.

Further, consolidating and collocating data into a centralized data repository is computationally costly in terms of providing the necessary capacity for the centralized data repository and network bandwidth for data replication, and also introduces latency delays. Thus, conventional systems suffer from a lack of scalability.

SUMMARY

Example solutions for optimizing an initial query execution plan for a federated data base are described herein. The disclosed examples are described in detail below with reference to the accompanying drawing figures listed below. The following summary is provided to illustrate some examples disclosed herein.

In certain examples, an initial query execution plan includes a group of operations that conform to a recognized pattern of operations, the pattern including fetching data from one of a plurality of data stores. In response to a detection of the pattern and of the presence of a condition, an optimized query execution plan is created from the initial query execution plan by replacing the group of operations with a first execution branch and a second execution branch, wherein the optimized query execution plan executes at least one of the first and second execution branches. The first execution branch includes first operations for fetching the data from a first one of the plurality of data stores and the second execution branch comprise second operations for fetching at least a subgroup of the data from a second one of the plurality of data stores.

BRIEF DESCRIPTION OF THE DRAWINGS

The disclosed examples are described in detail below with reference to the accompanying drawing figures listed below:

FIG. 2 illustrates an exemplary graph for explaining the operation of example architectures, such as the architecture of FIG. 1;

FIGS. 3A-3D illustrate exemplary sub-schema for example architectures, such as the architecture of FIG. 1;

FIGS. 4A and 4B illustrate exemplary sub-schema for example architectures, such as the architecture of FIG. 1;

FIGS. 5A-5F illustrate example queries and schema details for example architectures, such as the architecture of FIG. 1;

FIG. 7 shows another flowchart illustrating exemplary operations to be performed when constructing a federated query using example architectures, such as the architecture of FIG. 1;

FIG. 12 shows a flowchart illustrating by way of example a process for generating an optimized query execution plan from an initial execution plan.

FIG. 17 shows a block diagram of an example computing device suitable for implementing some of the various examples disclosed herein.

Corresponding reference characters indicate corresponding parts throughout the drawings.

DETAILED DESCRIPTION

Figure 1:
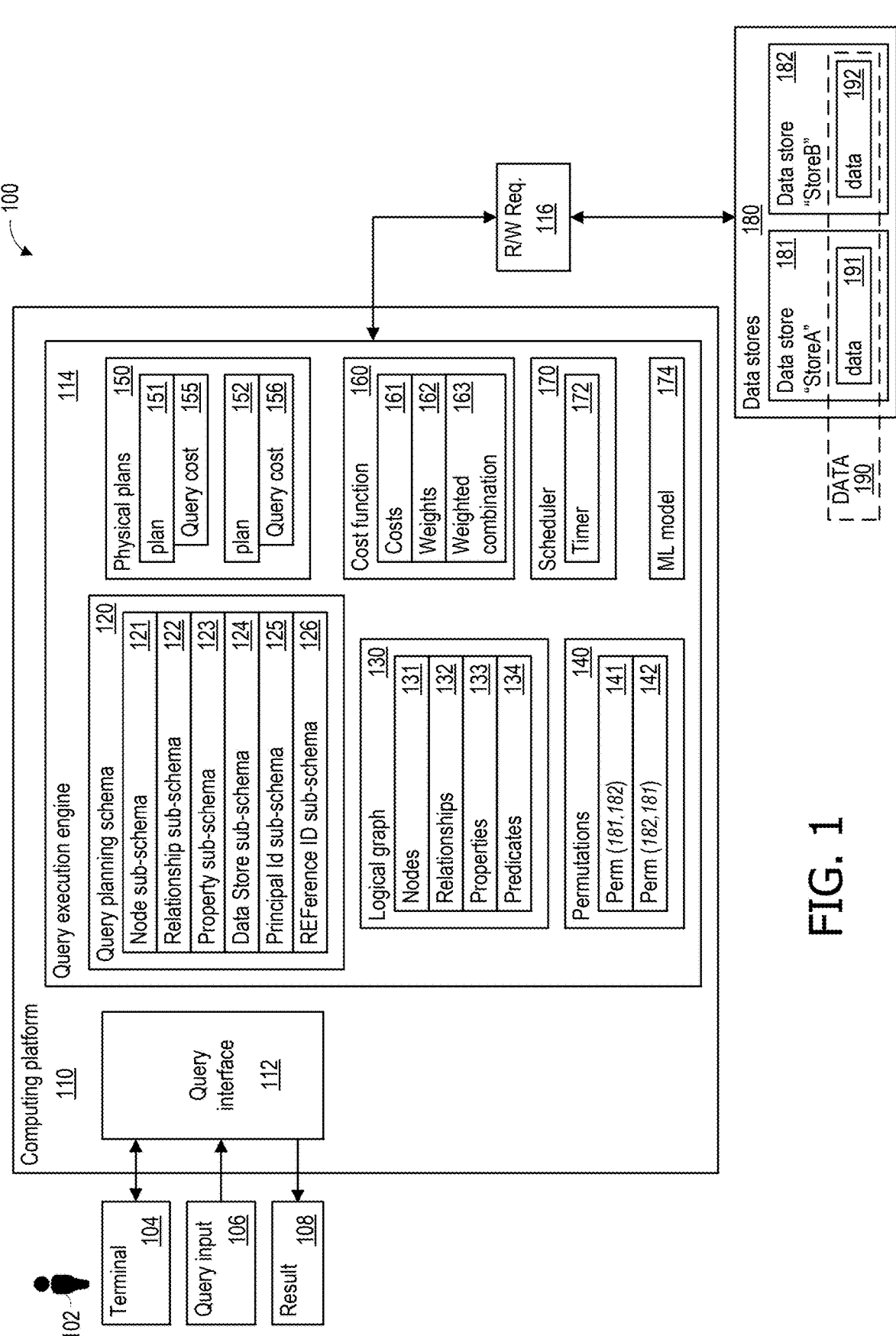
FIG. 1 illustrates an example architecture that advantageously provides for distribution of federated graph queries using schemas.

A graph database comprises data related to a graph that comprises a set of nodes, each having a type and a set of properties for each type, and a set of directed edges, often graphically represented by arrows, that define relationships between the nodes. Each node is a data object representing real-world people, places, or things. For example, one node represents a person, and properties of that node include the person's name, email address, title, phone number, etc. The edges have properties that depend on the type of relationship it defines. As used herein, a set is non-null.

A federated database is a database that logically extends across a plurality of data stores, wherein the data stores can be heterogenous and/or geographically dispersed. A federated search is used to search multiple data sources with just a single query from a single search interface. Data sources include databases such as object stores, key-value stores, application programming interfaces (APIs) that pull data from other sources, and other data sources that are collectively referred to herein as data stores. A query planning schema is leveraged to enable a single query execution engine to treat disparate data stores, which have potentially differing search capabilities, differing data content, differing latencies, differing physical characteristics (e.g., power sources), and other differences, such as being located in different geographical regions that are geographically distant from one another, as a single graph. A query planner uses the query planning schema to generate a query execution plan from the input query. The actual query execution plan is centralized, distributed, or a mixture.

The query planner performs multiple discrete successive steps of refinement, starting out with a naïve plan and then iteratively improving it. Various methods for optimizing received query execution plans can leverage complex data store schema in which certain data is available from multiple different data stores and data cardinality varies across sub query results. The various examples will be described in detail with reference to the accompanying drawings. Generally, the same reference numbers will be used throughout the drawings to refer to the same or like parts. References made throughout this disclosure relating to specific examples and implementations are provided solely for illustrative purposes but, unless indicated to the contrary, are not meant to limit all examples.

In one example, an initial query execution plan is optimized by identifying a set of operations in the initial query execution plan that conform to a recognized pattern of operations, the pattern including fetching a set of data from one of a plurality of data stores. In response to a detection of the pattern and of the presence of a condition, an optimized query execution plan is created from the initial query execution plan by replacing the set of operations with a first execution branch and a second execution branch, wherein the optimized query execution plan executes at least one of the first and second execution branches. The first execution branch includes first operations for fetching the set of data from a first one of the plurality of data stores and the second execution branch comprise second operations for fetching at least a subset of the data from a second one of the plurality of data stores.

For example, the pattern is defined to require fetching deterministic data from the data store and the condition is that the data store is a cache data store. In another example, the data store is not a cache data store but a cache data store for storing the data is available. In this case, the first operations can include fetching the data from the cache data store and, only when a cache miss results from this fetching do the second operations execute wherein the data is fetched from the non-cache data store.

In another example, the pattern requires fetching data from a data store and the condition is that a second data store is available that also contains the data. For example, it maintains a copy of the data in a different format or in a different geographical location. In this case, the first operations comprise operations for fetching the data from the data store and the second operations comprise operations for fetching the data from the second data store only when the data store is unavailable. For example, the data store is down for maintenance.

In yet another example, the pattern includes fetching a first set of data from a first data store and fetching a second set of data from a second data store. When a condition comprising detecting that the initial query execution plan computes an intersection of the first and second data sets, then the initial query execution plan can be optimized by instantiating the first operations for fetching the first data set from the first data store and instantiating the second operations for sending the first data set and a subplan to the second data store, the subplan causing the second data store to fetch the second data set, compute an intersection between the first data set and the second data set, and then returning the computed intersection.

In yet another example, a computer storage device has instructions stored thereon which, on execution by a computer, cause the computer to perform operations for optimizing an initial query execution plan for a federated database. The operations include receiving input comprising an initial query execution plan and detecting in the initial query execution plan operations for fetching a first data set from a first data store, operations for fetching a second data set from a second data store, and operations for returning an intersection of a first data set and a second data set. In response to detecting this pattern of operations, a size of the first data set and a size of the second data set, wherein the size of the first data set is less than the size of the second data set, are predicted, and it is determined if the predicted size of the second data set is more than twice the predicted size of the first data set. If so, an optimized query execution plan is generated from the initial query execution plan by instantiating therein: (a) operations for fetching the first data set from the first data store and (b) operations for sending to the second data store the first data set and a subplan, the subplan causing the second data store to fetch the second dataset, compute an intersection of the first data set and the second data set, and return the intersection of the first and second data sets.

In an enterprise setting, productivity workflows are often centered around objects of collaboration, such as a chat or email thread, a document, or service tickets in a domain specific task management system. These enterprise objects often exhibit a relational structure using a resource description framework (RDF), which enables a graph representation for such data. Some of the largest tenants span millions of users connected in a single coherent graph structure. Relationships in this graph describe workflow-oriented connections between enterprise users and workflow objects, answering questions such as documents modified around a user's immediate organization, or documents shared within the user's group.

Signals describing these interactions are stored in a collection of workload specific data stores, which are optimized to serve the specific category of request traffic. Differences between these data stores can include how the data is indexed or partitioned. Different ones of the data stores might store an overlapping set of content, both partially complete and subject to regional restrictions, e.g., the General Data Protection Regulation (GDPR) in Europe. Aspects of the disclosure provide a shared platform for expressing queries directed to the interdependence of these enterprise objects. Further, the shared query interface is decoupled from the complex nature of the specific data stores, in some examples.

The technology described herein improves the efficiency of computing devices, for example, reducing power consumption, permitting queries to be performed efficiently across disparate data stores, rather than requiring that the data is copied to a single data store, and by reducing network bandwidth. This is accomplished by generating a physical plan using a query planning schema, for various permutations of data stores to be searched, and then executing a query using a selected physical plan. In certain embodiments, techniques for optimizing query execution plans improve response time, robustness in case of failure of one or more data stores, and reduces network bandwidth. In this way, aspects of the disclosure perform efficient execution of distributed graph queries by leveraging rich schemas over the data and creating conditional execution plans therefor. Examples leverage centralized data repositories as well as specialized heterogeneous stores according to a distributed graph query needs for reducing data inconsistency and query execution latency.

Aspects of the disclosure are operable to search data in various technical fields such as web searching, employee roster querying (e.g., reporting hierarchies), searching customer activity history, searching computing resource allocation and usage, and more.

FIG. 1 illustrates an example architecture 100 that advantageously provides for distribution of federated graph queries using schemas. A user 102 uses a terminal 104 to access a query interface 112 on a computing platform 110. Computing platform 110 can be remote from user 102, local to user 102 (e.g., terminal 104 and computing platform 110 are a common computing environment), distributed, virtual, or might be a single computing device. User 102 enters a query input 106 to perform a query against data 190, and receives a query result 108 from a query execution engine 114. In another embodiment, query interface 112 receives a query and returns a result to a middle tier application. For example, a user interacts with a document or a calendar event on their desktop application, and, as a result of this interaction, the desktop application will require data such as a list of individuals that have viewed a document or who are invited to the event. This request is sent to a middle tier application which can then convert this request into a query which is then sent to query interface 112.

Data 190 is distributed among a set of data stores 180 that includes a data store 181, named "StoreA," and a data store 182, named "StoreB." Data store 181 has data 191, which is a portion of data 190, and data store 182 has data 192, which is another portion of data 190. For illustration purposes, only two data stores are shown, although it should be understood that some examples use a significantly larger number of data stores.

Query execution engine 114 uses a query planning schema 120 to generate physical plans 150, which is then converted into a set of read/write requests ("R/W Req.") 116 such that query input 106 is executed efficiently according to a cost function 160. As a preview to the more detailed description following, query execution engine 114 (1) generates a logical graph 130 from query input 106, (2) lists permutations 140 of set of data stores 180, (3) generates physical plans 150 (e.g., one for each permutation in permutations 140) that consume logical graph 130 using query planning schema 120, (4) determines a query cost for each physical plan (e.g., one for each permutation), (5) selects a physical plan based on its query cost, and (6) executes the selected physical plan 150, which includes accessing data stores 180 via read/write requests 116.

Query planning schema 120 includes multiple subschema: node sub-schema 121, described in further detail in relation to FIG. 3A; relationship sub-schema 122, described in further detail in relation to FIG. 3B; property sub-schema 123, described in further detail in relation to FIG. 3C; data store sub-schema 124, described in further detail in relation to FIG. 3D; principal identifier (ID) sub-schema 125, described in further detail in relation to FIG. 4A; and reference ID sub-schema 126, described in further detail in relation to FIG. 4B. Logical graph 130 has nodes 131, which are connected using relationships 132 that are graph edges. Nodes 131 and relationships 132 have properties indicated in properties 133, and logical graph 130 also has set of predicates 134 calculated from query input 106.

Permutations 140 has two permutations shown, permutation 141, which is {StoreA, StoreB} (also identifiable as {data store 181, data store 182}), and permutation 142, which is {StoreB, StoreA} (also identifiable as {data store 182, data store 181}). In general, a larger number of data stores produces a larger number of permutations. In some examples, the number of permutations is limited by a machine learning (ML) model 174, for example by ML model 174 identifying which permutations are not selected or rarely selected, and/or predicting which permutations are sufficiently unlikely to be selected to exclude them from consideration.

Physical plans 150 include a physical plan 151 and a physical plan 152. Physical plan 151 is for permutation 141 and has a query cost 155, whereas physical plan 152 is for permutation 142 and has a query cost 156. Physical plan 151 is indicated as being the selected physical plan, in this illustrated example, which is due to query cost 155 being the lowest query cost among query cost 155 and query cost 156 (e.g., the lowest query cost of the permutations). A physical plan is the query that is actually executed, and includes the sequence of operations that is performed on each store in which data is actually stored, whereas logical graph 130 is the structure of what user 102 is attempting to extract from data 190 when formulating query input 106.

A cost function 160 is used to determine query costs 155 and 156, and is made up of both costs 161 and weights 162 into a weighted combination 163 of costs. Examples of costs include freshness of the data, latency of communicating with each data store, power consumption by a data store, environmental impact such as whether the data store receives its power from renewable sources and/or the carbon footprint of the data store, energy efficiency of the data store, network cost such as the number of input/output (IO) operations, and a count of different data stores used. In some scenarios, it is preferable to use a single data store, if practical. The various costs enable user 102 to prioritize query execution on issues such as a preference for lower latency and/or a preference for a lower carbon footprint.

A scheduler 170 uses a timer 172 to determine whether pendency of read/write requests 116 has been long enough to reprioritize weights 162 for latency, or whether other preferences remain practical. For example, user 102 (or middleware) has expressed a preference for energy efficiency and so weights 162 are set accordingly. However, if the most energy-efficient data stores are slow to respond, and read/write request 116 has been pending for longer than some threshold time, scheduler 170 adjusts weights 162 to change the preference for latency. The consequences of changing weights 162 is that query costs 155 and 156 can each change, and the physical plan that had been selected initially is jettisoned for a new selected physical plan, based on the new values of query costs 155 and 156.

ML model 174 optimizes queries for some weighted combination of costs 161. Query planning schema 120 includes information about data provenance and expected freshness guarantees, so that optimization decisions can be based on this information, for example freshness versus latency and consistency. Querying across data stores results in a performance penalty (e.g., higher latency) but in certain scenarios yields superior data freshness (e.g., more recent data). Adding statistics about expected latency makes it possible to further increase the accuracy of optimization decisions. ML model 174 can use rule-based optimizations and/or heuristics/cost-based optimizations.

An example consistent property graph includes nodes, relationships, and properties. Nodes might have multiple labels expressing their type or subclass. Relationships similarly have types specifying the intent of the relationship. Strict relationship types require particular node labels and directionality of the relationship in order to be semantically correct. For example, a relationship describing the modification of a document by an individual requires two different node labels fixed to prescribed sides of the relationship (e.g., person and document). Both nodes and relationship types can be used by a query to sub-divide relevant subsections of a particular graph.

Both nodes and relationships hold unique identifiers specific to instances of each. However, only node identifiers are used as a starting point for ordered traversal of a graph. Nodes hold any number of relationships regardless of direction; however, valid relationships require two nodes to exist. Both relationships and entities hold a selection of properties. Properties hold a key for identifying a particular entry in a set of properties, and for each, a value. These values can hold scalar values such as integers, strings, or temporal values such as time. Properties are uniquely defined by nodes or relationships, and any instance of each can hold differing sets of properties.

Figure 2:
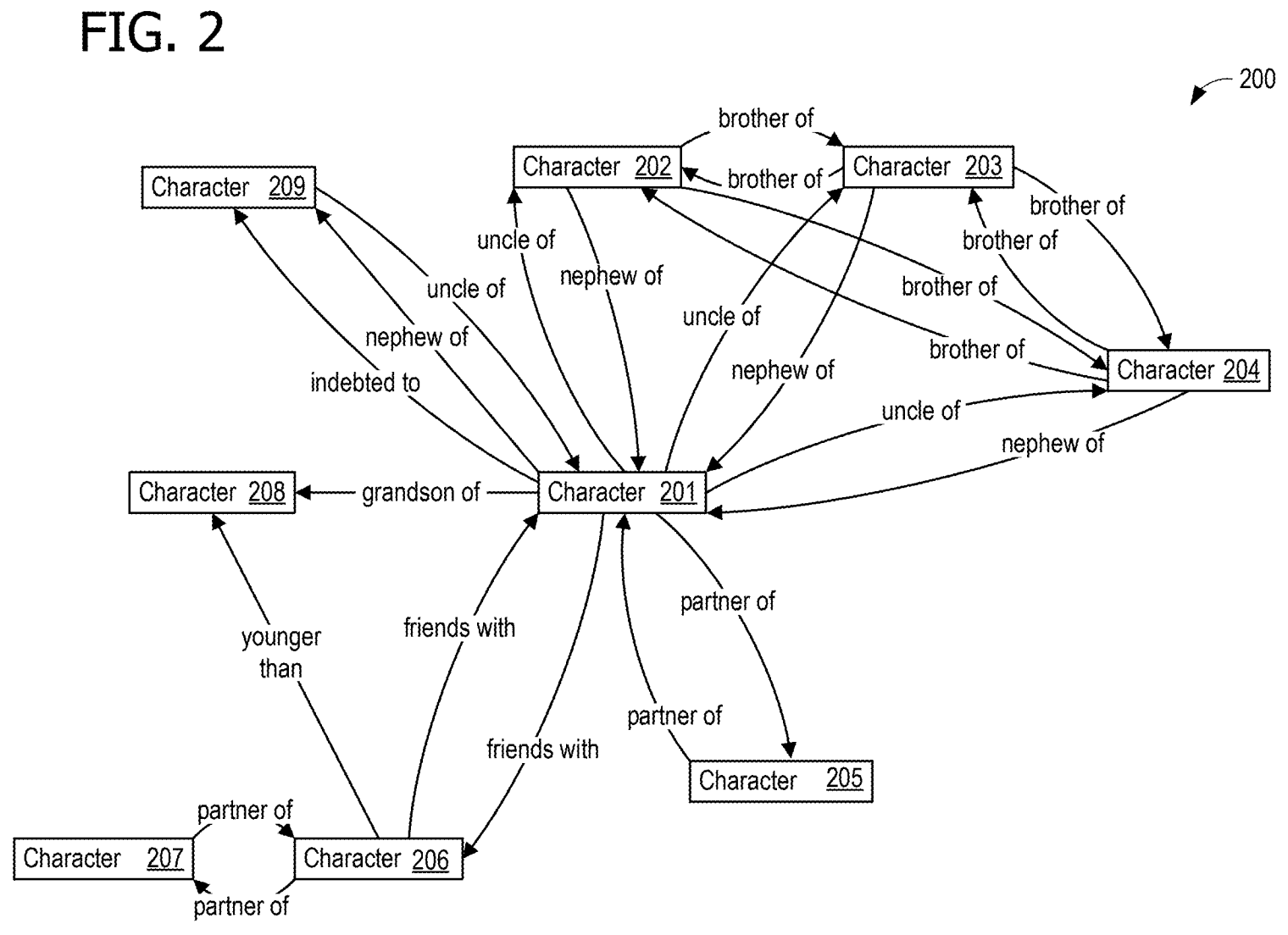

FIG. 2 illustrates an exemplary graph 200 that is used to provide descriptions of nodes and edges. Graph 200 represents characters in a story and includes nine characters, characters 201-209. Character 201 has relationships shown with each of characters 202-206 and characters 208 and 209. The relationships are directional. Character 201 is an uncle of character 202, and character 202 is a nephew of character 201. This relationship pairing also exists between character 201 and each of character 203 and character 204. Characters 202, 203, and 204 have relationships among each other of being brothers. Character 201 is a partner of character 205, who has a reciprocal partner relationship with character 201.

Character 206 is a friend of character 201, who has a reciprocal friend relationship with character 206. Character 206 is a partner of character 207, who has a reciprocal partner relationship with character 206. Some relationships that are mirrored between nodes (e.g., partner of, brother of, friends with) can be modeled as a single bi-directional relationship, in some examples.

Character 206 is younger than character 208, and character 201 is a grandson of character 208. Character 201 is a nephew of character 209, and character 209 is an uncle of character 201. Character 201 is also indebted to character 209. An example of relationship identifiers and properties for graph 200, in which Uncle Sam (last name Wilson) is the uncle of John Doe, is: [character 201; <ID>: 0; FirstName: John; LastName: Doe; Name: John Doe], [character 209; <ID>: 8; FirstName: Sam; LastName: Wilson; Name: Sam Wilson], and [indebted to; <ID>: 81; Amount: $100]. Each node and relationship has its own properties, and the identifiers uniquely identify a node or relationship.

Query Planning

FIGS. 3A-3D, 4A, and 4B illustrate exemplary sub-schema of query planning schema 120. Query planning schema 120 is complete in that it covers the relevant aspects of query planning and run-time execution. Node sub-schema 121 describes aspects specific to nodes, and an example 300a is shown in FIG. 3A. Three fields are illustrated, named ID, Properties, and Provenance. The ID is the principal ID, or external ID, of the node. Properties is a set of properties available on the node that can be referenced to express filtering, ordering, or other parameters, or returned in the response payload of query result 108. Provenance describes the origin and availability of the node, such as in which storage systems the node is found, which should be considered the authoritative source, which are considered caches, and/or freshness information.

Relationship sub-schema 122 describes aspects specific to relationships, and an example 300b is shown in FIG. 3B. Four fields are illustrated, named Source Node ID, Target Node ID, Properties, and Type. Source Node ID is the ID of the node from which the relationship is outbound. Target Node ID is the ID of the node to which the relationship is inbound. Properties is a set of available relationship properties, with similar uses as node properties. Type is the type of relationship.

Property sub-schema 123 applies to all properties, whether they stored on nodes or relationships (edges), and an example 300c is shown in FIG. 3C. Four fields are illustrated, named Property Name, Type, Data Classification, and Provenance. Property Name is a string that uniquely identifies the property in the global schema. Type is the type of the property, such as string, integer, byte, or other data type. Data Classification is the classification of the property, indicating sensitivity or dissemination limits. Examples include personally identifiable information (PII), such as European Union (EU) protected PII, pseudonymized information, anonymized information, and unprotected information. Provenance describes the origin and availability of the property, such as in which storage systems the property is found, which should be considered the authoritative source, which are considered caches, and/or freshness information.

Data Store sub-schema 124 describes the capabilities of a given data store, and an example 300d is shown in FIG. 3D. Three fields are illustrated, named Store ID, Store Name, and Capabilities. Store ID is a unique identifier for a particular data store. Store Name is a label of the store that is more useful for human understanding. For example, Store ID might be a hexadecimal number, whereas Store Name includes useful information that enables a human reader to more readily appreciate the location and/or other aspects of a data store. Capabilities identifies query search capabilities supported by the data store.

In addition, due to the distributed nature of the data, for the data to be referenced as a graph, both nodes and relationships are addressable. Addressing uses identifiers. Some examples use two types of identifiers: principal IDs, also known as external IDs, and reference IDs. Principal IDs identify a logical item and serves as a globally unique id to locate some entity (e.g., node or relationship/edge). Principal IDs are defined using principal ID sub-schema 125, and an example 400a is shown in FIG. 4A. Two fields are illustrated, named Data Classification and Value. Data Classification is equivalent to the Data Classification field of property sub-schema 123, although applied to principal ID sub-schema 125. Value is a unique identifier of an entity (e.g., node or relationship) within the global arrangement.

Reference IDs identify a physical item, and are used internally in the graph to allow multiple (e.g., partial) representations of the same logical entity (e.g., node or relationship/edge). Reference IDs are defined using reference ID sub-schema 126, and an example 400b is shown in FIG. 4B. Four fields are illustrated, named Data Classification, Region ID, System ID, and Value. Data Classification is equivalent to the Data Classification field of property sub-schema 123, although applied to reference ID sub-schema 126. Region ID is an identification of the logical region in which an entity is located. System ID is an identification of the target system in which an entity is located. Value is a unique identifier of an entity (e.g., node or relationship) within a specific target system and region pair.

FIGS. 5A-5F illustrate example queries and schema details. FIG. 5A illustrates an example query 500a for a scenario in which a property exists only in a single data store. Query input 106 is [MATCH (user) WHERE id(user)= "userId" RETURN user. Name, user.EmailAddress]. In this scenario, the federated query must be directed towards the data store containing the requested property, which is StoreA (data store 181).

While the Name is retrievable from both StoreA and StoreB, the EmailAddress can be retrieved from only StoreA. This means that in order to fulfill the query, StoreA must be targeted. Whether the query retrieves Name from StoreA or StoreB depends on the latency and other performance characteristics of the distributed system and the underlying stores.

FIG. 5B illustrates an example 500b for a scenario in which a relationship (edge) exists only in a single data store. Query input 106 is [MATCH (user)-[r:Messaged]→(friend) WHERE id(user)="userId"; RETURN user.Name, friend. Name]. In this scenario, the federated query must be directed towards the data store containing the requested relationship, which is StoreB (also referred to as data store 182).

While the Name is retrievable from both StoreA and StoreB, the ID can be retrieved from only StoreB. This means that in order to fulfill the query, StoreB must be targeted. Whether the query retrieves Name from StoreA or StoreB depends on the latency and other performance characteristics of the distributed system and the underlying stores.

FIG. 5C illustrates an example 500c for a scenario in which only a single data store supports the search capability indicated in the query, and fortunately also holds all the required data. Query input 106 is [MATCH (user)-[r:Modified]→(document); WHERE id(user)="userId" AND document. Title="Status Update"; RETURN user.Name, document.Title]. In this scenario, the federated query must be directed towards the data store supporting the requested capability and holding the required data to successfully evaluate the query, which is StoreB (also referred to as data store 182).

While the Name, Document Title, and Messaged is retrievable from both StoreA and StoreB, and both StoreA and StoreB support traversal of edges (e.g., relationships), only StoreB supports looking up a node by performing a search and finding an exact match on a given property. This means that in order to fulfill the query, StoreB must be targeted to identify the relevant documents. Apart from this step of the query, both StoreA and StoreB have the necessary data and capabilities to continue the remainder of the query execution. Which data store chosen depends on latency, performance, resource consumption, or other aspects of the query cost function.

FIG. 5D illustrates an example 500d for a scenario in which multiple data stores support the search capability indicated in the query, but only a single data store holds the required data. Query input 106 is [MATCH (user)-[r:Modified]→(document); WHERE id(user)="userId" AND document. Title="Status Update"; RETURN user.Name, document.Title]. In this scenario, the federated query must be directed towards the data store holding the required data, which is StoreA (also referred to as data store 181).

While the Name and Message is retrievable from both StoreA and StoreB, and both StoreA and StoreB support traversal of edges as well as looking up a node by looking up a node by performing a search and finding an exact match on a given property, only StoreA holds Document Title. This means that in order to fulfill the query, StoreA must be targeted to identify the relevant documents. Apart from this step of the query, both StoreA and StoreB have the necessary data and capabilities to continue the remainder of the query execution. Which data store chosen depends on latency, performance, resource consumption, or other aspects of the query cost function.

FIG. 5E illustrates an example 500e for a scenario in which multiple data stores hold the required data, but user 102 has prioritized data consistency (e.g., as a context parameter input with the query). Query input 106 is [MATCH (user) WHERE id(user)="userId" RETURN user. Name]. In this scenario, the federated query is directed towards the data store having AuthoritativeSource set to "true", which is StoreA (also referred to as data store 181). StoreB (also referred to as data store 182) has AuthoritativeSource set to "false", indicating that StoreB has a replica of the data.

Both StoreA and StoreB support looking up a node by its ID and contain the required data (e.g., Name). However, StoreA has a much superior freshness guarantee (e.g., more recent data) than StoreB, and would therefore be prioritized when executing a query that prioritized freshness.

FIG. 5F illustrates an example 500f for a scenario in which multiple data stores hold the required data, but user 102 has prioritized latency (e.g., as a context parameter input with the query). Query input 106 is [MATCH (user) WHERE id(user)="userId" RETURN user.Name]. In this scenario, the federated query is directed towards the data store having the lowest latency, which is StoreB (also referred to as data store 182).

Both StoreA and StoreB support looking up a node by its ID and contain the required data (e.g., Name). However, StoreA has an average observed latency of 250 milliseconds (ms), whereas StoreB has an average observed latency of 30 ms. Thus, StoreB is prioritized when executing the query. The observed latency for a data store is not strictly a part of query planning schema 120, but rather metadata generated while operating query execution engine 114. It should be understood that other metrics, such as data store reliability, the estimated carbon footprint of a query execution, the estimated monetary cost of a query execution, and others, can be used. Some metrics can be included as part of data store sub-schema 124, while others are observed and/or calculated as part of operating query execution engine 114.

Figure 6:
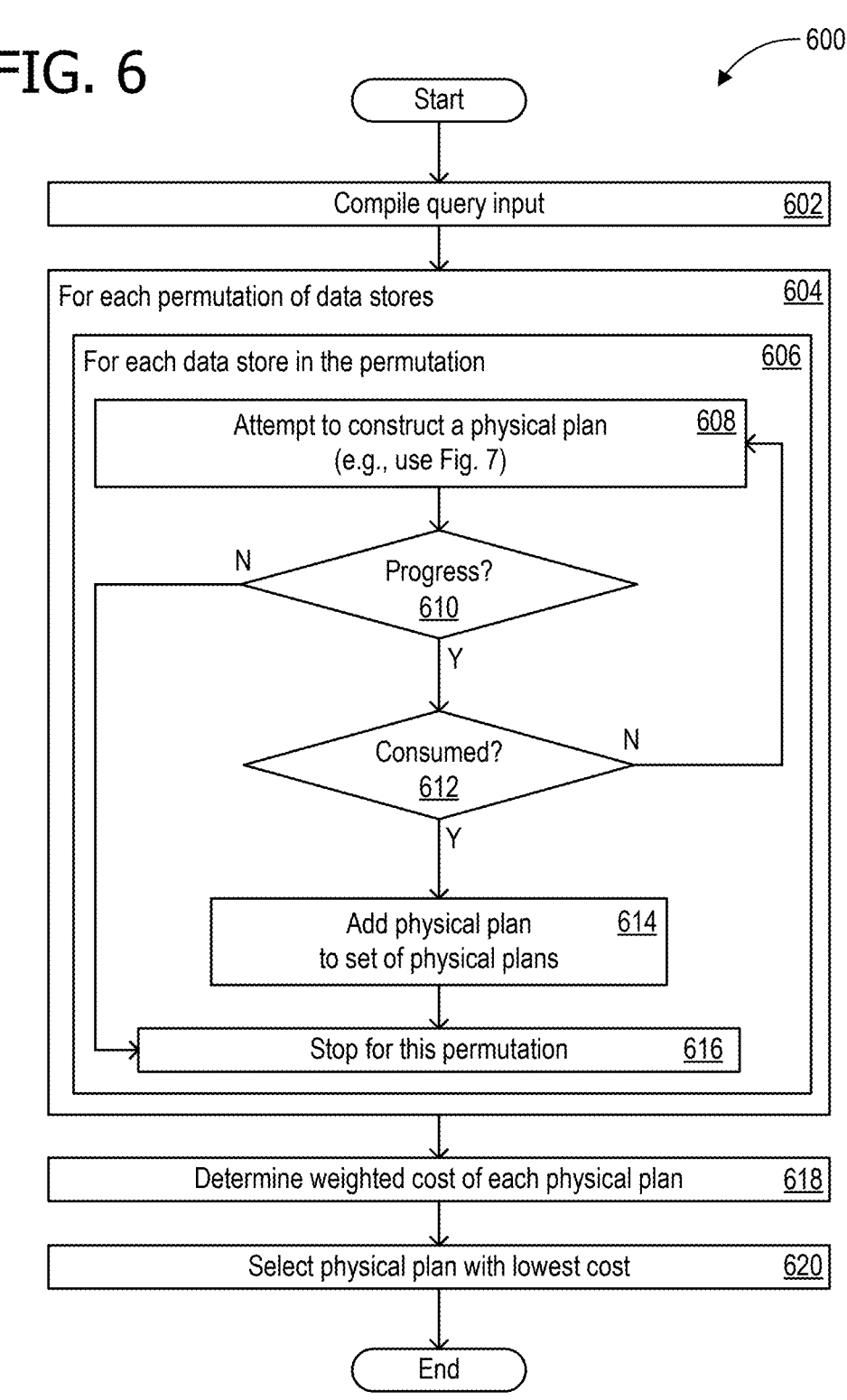
FIG. 6 shows a flowchart illustrating exemplary operations to be performed when constructing a federated query using example architectures, such as the architecture of FIG. 1.

FIG. 6 shows a flowchart 600 illustrating exemplary operations to be performed by architecture 100, and FIG. 7 shows a flowchart 700 also illustrating exemplary operations to be performed by architecture 100. Together, flowcharts 600 and 700 provide a first description of the generation and selection of an execution plan 150; a complementary description is provided by flowchart 800 of FIG. 8. In some examples, operations described for flowcharts 600 and 700 are performed by computing device 1700 of FIG. 17.

Flowchart 600 commences with compiling query input 106 in operation 602, to produce logical graph 130 for instantiation. Operation 604 sets up an outer loop that is performed for each permutation of data stores that are available for performing query 116. Operation 606 sets up an inner loop for each data store in the permutation (in order), within the loop of operation 604. Operation 608 attempts to construct a physical plan (e.g., an expression tree) from the remaining portion of logical graph 130 that is yet to be consumed. Operation 608 uses flowchart 700 of FIG. 7, described below.

Decision operation 610 determines whether flowchart 700 made any progress on consuming logical graph 130. If not, flowchart 600 moves to operation 616 that stops the inner loop for the current permutation and moves on to the subsequent permutation. If, however, progress had been made on consuming more of logical graph 130, decision operation 612 determines whether the entirety of logical graph 130 is consumed. If so, operation 614 adds the current physical plan to the growing set of possible physical plans (e.g., physical plan 152 is added to physical plans 150) and flowchart 600 moves to operation 616 to cease for this permutation.

Otherwise, if progress had been made, and logical graph 130 remains only partially consumed, flowchart 600 returns to operation 608 to continue building the current partial physical plan for this permutation, using an updated logical graph 130. When both loops are exited, operation 618 determines (e.g., calculates or generates) the weighted cost of each physical plan, and operation 620 selects the physical plan with the lowest weighted cost.

This consumption algorithm of flowchart 700, performed as part of operation 608 and shown in FIG. 7, is performed for a single data store, whether the logical graph is partially consumed or not at all, and then returns to flowchart 600. Flowchart 700 commences with determining whether the current data store is able to contribute progress towards completing the consumption of logical graph 130 using query planning schema 120, in operation 702.

Operation 704 instantiates new nodes of logical graph 130, using operations 706 and 708. Operation 706 determines whether the data store has any capability to instantiate nodes and whether there is a predicate present useful for this purpose. Operation 708 determines which of the required properties from the graph to load. Operation 710 instantiates new relationships of logical graph 130, using operations 712 and 714. Operation 712 determines whether the data store has any capability to instantiate relationships and whether there is a predicate useful for this purpose. Operation 714 determines which of the required properties from the graph to load. Operation 716 instantiates existing nodes and relationships of logical graph 130 with new properties, using operations 718 and 720. Operation 718 determines whether the data store has any capability to instantiate nodes and/or relationships by using IDs of existing nodes and/or relationships or whether there is a predicate present useful for this purpose. Operation 720 determines which of the required properties from the graph to load.

Decision operation 722 determines whether the current data store can contribute progress to the consumption of logical graph 130. There must be at least one new property loaded, otherwise there will be no consumption progress made. If the current data store can contribute, operation 724 integrates node or relationship creation in the physical plan, marks related nodes, relationships, properties, and predicates as consumed, and repeats from operation 704 with the updated logical graph 130.

Otherwise, if further contribution cannot be made, decision operation 726 determines whether logical graph 130 is fully consumed. If so, operation 728 returns the resulting complete physical plan with no remaining logical graph. If logical graph 130 is not fully consumed, decision operation 730 determines whether at least some progress has been made for this data store. If so, operation 732 returns the remaining logical graph 130 along with the partial physical plan for the current data store. If no progress has been made with this data store, operation 734 returns the input logical graph 130 with no physical plan progress.

Figure 8:
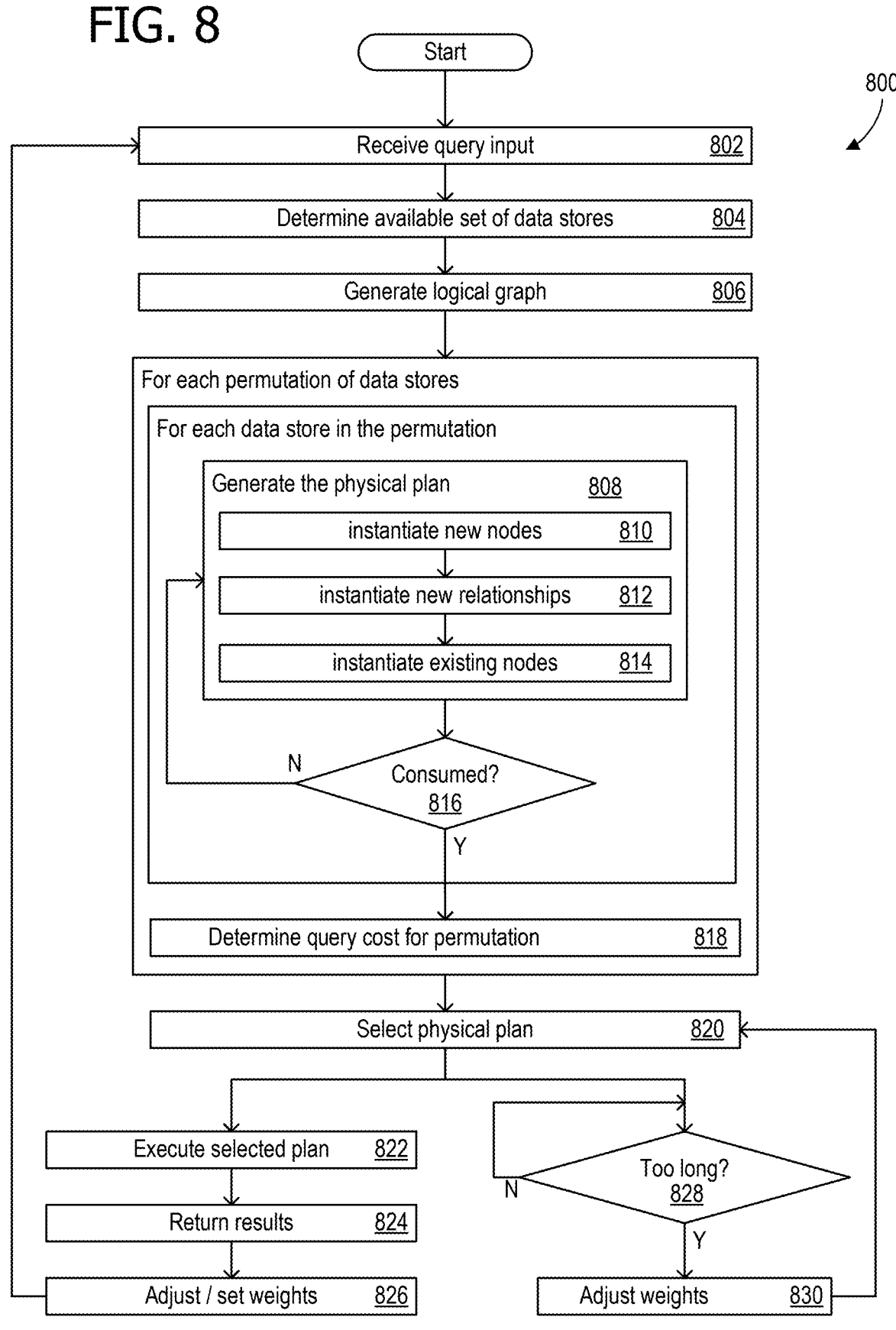
FIG. 8 shows a flowchart illustrating exemplary operations to be performed when using example architectures, such as the architecture of FIG. 1.

FIG. 8 shows a flowchart 800 illustrating exemplary operations to be performed by architecture 100, and provides a description of the query process that complements flowcharts 600 and 700. In some examples, operations described for flowchart 800 are performed by computing device 1700 of FIG. 17. Flowchart 800 commences with receiving query input 106 in operation 802. Operation 804 determines the set of data stores 180 that are available for performing query 116. Operation 806 generates logical graph 130 based on at least query input 106. Logical graph 130 comprises nodes, relationships, and properties required to satisfy query input 106, and further comprises set of predicates 134 calculated from query input 106.

Flowchart 800 performs a double-nested loop, in which the outer loop is performed for each permutation of data stores in set of data stores 180 that is to be considered, and the inner loop is performed for each data store in the permutation, while logical graph 130 has not yet been fully consumed. In some examples, not every possible permutation of data stores is considered. For example, some permutations are omitted by ML model 17, due to the low likelihood of selection of that permutation.

Operation 808 is performed within the inner loop, using operations 810-814 to generate physical plans 150 based on at least query planning schema 120. In some examples, query planning schema 120 comprises node sub-schema 121, relationship sub-schema 122, property sub-schema 123, data store sub-schema 124, principal ID sub-schema 125, and reference ID sub-schema 126. Operation 810 instantiates new nodes of logical graph 130 and loads required properties. Operation 812 instantiates new relationships of logical graph 130 and loads required properties. Operation 814 instantiates existing nodes of logical graph 130 and loads required properties.

Decision operation 816 determines whether logical graph 130 has been fully consumed by the existing physical plan. If so, flowchart 800 exits the inner loop to operation 818. Otherwise, flowchart 800 remains within the inner loop and returns to operation 808 to continue building the current physical plan using the next data store listed in the current permutation.

Operation 818 determines the query cost for the permutation, such as query cost 155 for physical plan 151 of permutation 141 or query cost 156 for physical plan 152 of permutation 142. In some examples, the query cost comprises at least one cost or a weighted combination of costs selected from one or more of: freshness, latency, power consumption, environmental impact, energy efficiency, network cost, and a count of different data stores used. Operation 820 selects the selected physical plan (e.g., physical plan 151) based on at least the query cost of each permutation.

Operation 822 executes query 116 based on at least the selected physical plan, and operation 824 returns query results 108 of the selected physical query execution plan. In operation 826, ML model 174 monitors the performance of the query execution and determines weights 162 for the combination weighting of weighted combination 163. Weighted combination 163 should then improve the performance of the next query when flowchart 800 returns to operation 802.

In parallel with operation 822, scheduler 170 monitors timer 172 to determine whether the selected query execution plan has been pending for too long, in decision operation

828. If so, operation 830 adjusts weights 162 of weighted combination 163, and when flowchart 800 returns to operation 820 a new physical plan is selected for execution as query 116.

Figure 9:
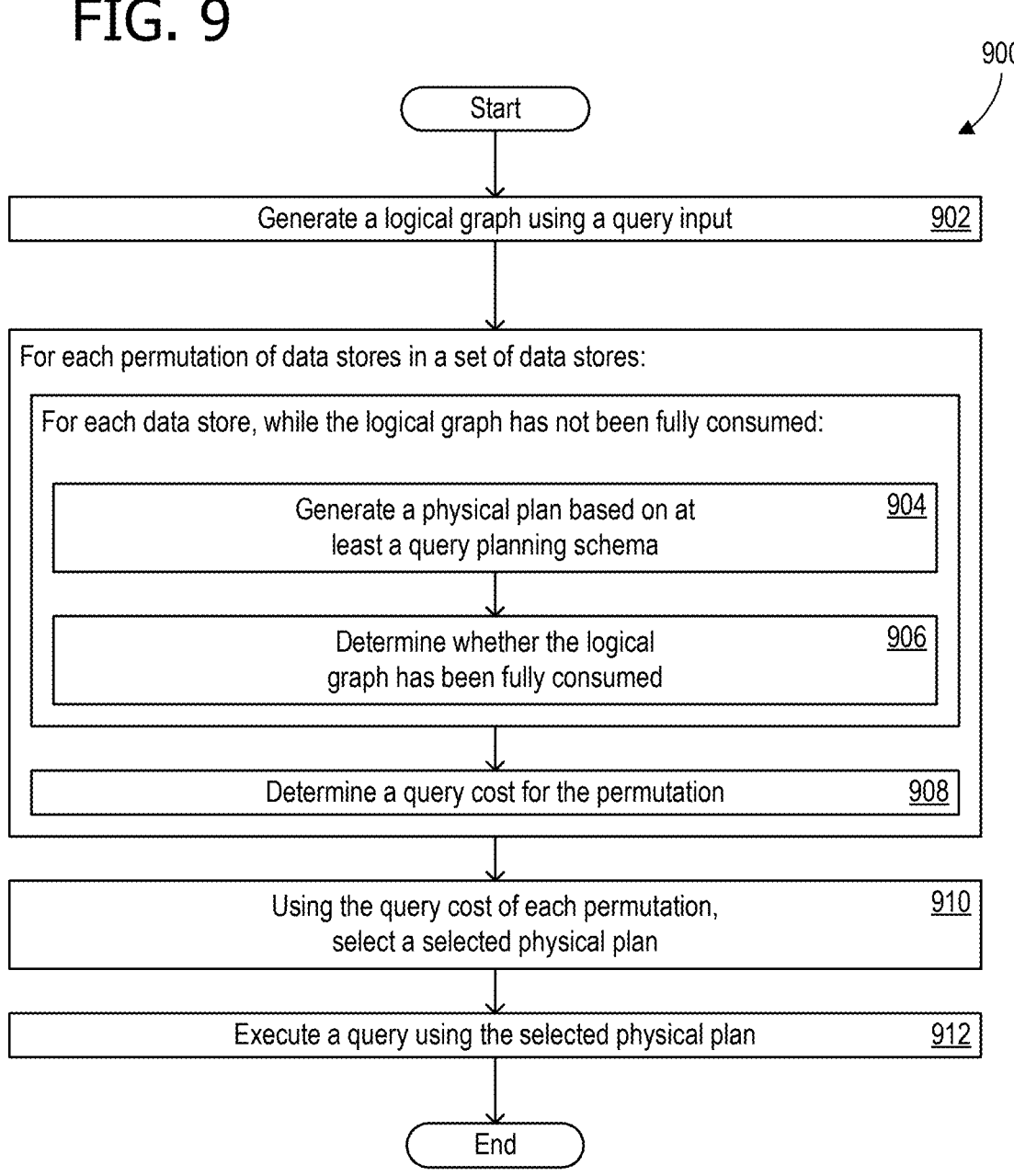
FIG. 9 shows another flowchart illustrating exemplary operations to be performed when using example architectures, such as the architecture of FIG. 1.

FIG. 9 shows a flowchart 900 illustrating exemplary operations to be performed by architecture 100. In some examples, operations described for flowchart 900 are performed by computing device 1700 of FIG. 17. Flowchart 900 commences with operation 902, which includes generating a logical graph using a query input.

Operations 904 and 906 are performed within a double-nested loop, and operation 908 is performed within the outer loop. The outer loop is performed for each permutation of data stores in a set of data stores, and the inner loop is performed for each data store in the permutation (e.g., in the order given by the permutation), while the logical graph has not been fully consumed. Operation 904 includes generating a physical plan using a query planning schema, and operation 906 includes determining whether the logical graph has been fully consumed. Operation 908 includes determining a query cost for the permutation. Operation 910 includes, using the query cost of each permutation, selecting a selected physical plan, and operation 912 includes executing a query using the selected physical plan.

Deployment Scenario

Figure 10:
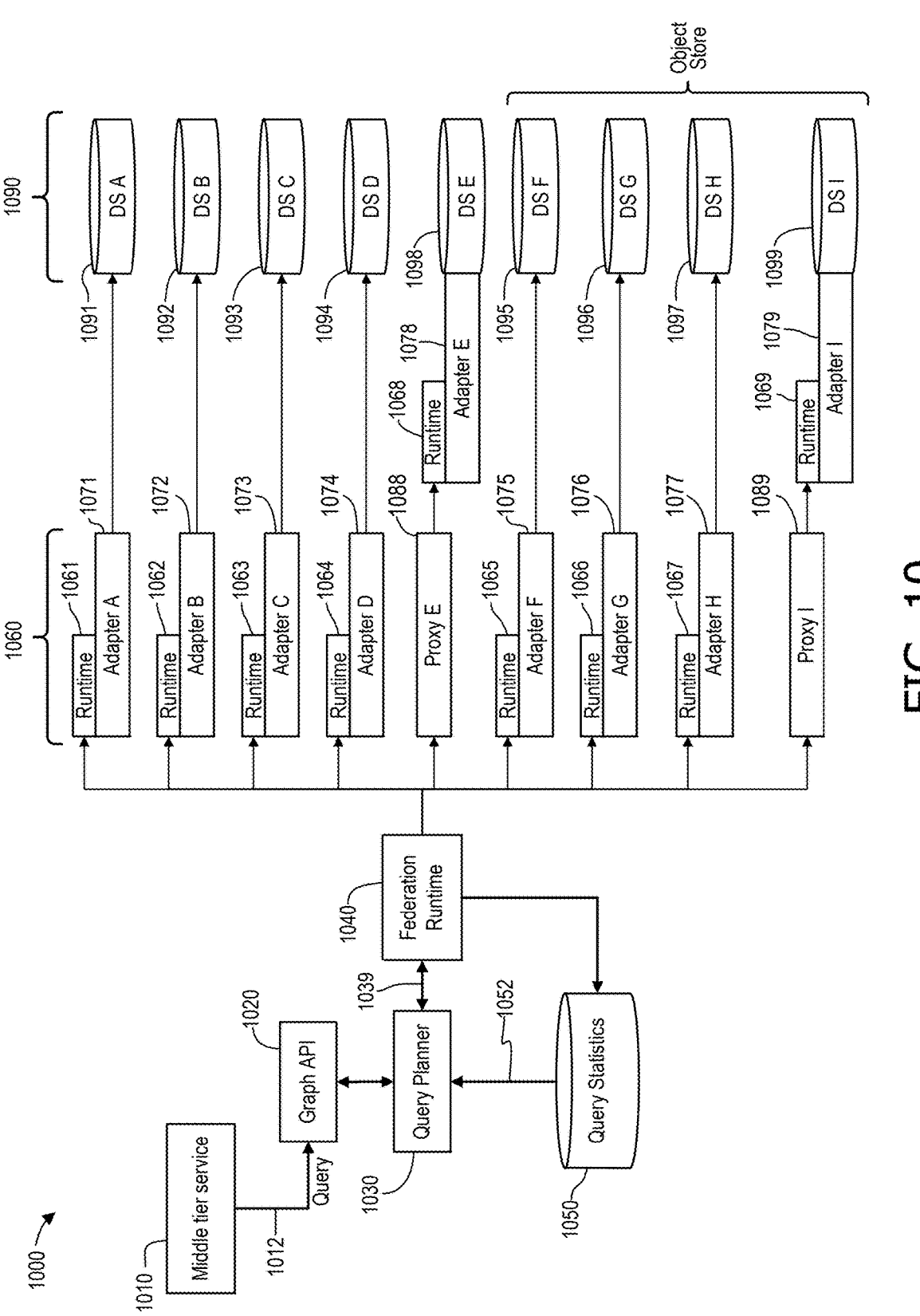
FIG. 10 shows an exemplary environment for implementing the technology described herein.

FIG. 10, is a block diagram illustrating, by way of example, environment 1000 for optimizing federated graph query plans. Environment 1000 comprises a set of services including a middle tier service 1010, a graph API service 1020, a query planner service 1030, and a federation runtime service 1040. In addition, a query statistics database 1050 is provided. Each service 1010, 1020, 1030, 1040, and 1050 can comprise a stand-alone computing system or virtual machine (VM), or a scalable cluster of compute platforms such as physical hosts, VMs or a scalable application using a modern containerized services platform. Any of services 1010, 1020, 1030, 1040, and 1050, can be combined or further divided into microservices. For example, query planner 1030, federation runtime 1040, and query statistics database 1050 can be combined into a unified query execution planner and optimizer.

Middle tier service 1010 generates queries targeting data maintained in data stores 1080. For example, middle tier service 1010 can receive an API call from a centralized productivity application such as an email and calendar application. In an example, a user searches for email addresses of members of his or her organizational group and a request this data is sent to middle tier service 1010 via a REST API or other inter-process communication mechanism (not shown). Middle tier service 1010, from the API call, generates a query 1012 which it sends to graph API service 1020. Graph API service acts as a load balancer across a plurality of scaled-out instances of query planner services 1030 (only one shown) and upon receipt of query 1012, forward the query to a selected instance of query planner 1030. Query planner 1030 and federation runtime 1040 are components of query execution engine 114 described above with reference to FIG. 1. Query planner 1030 performs multiple discrete successive steps of refinement of a query execution plan, starting with a naïve plan and iteratively improving it. In a later stage of optimization, execution branches can be instantiated to support advanced optimization of the query execution plan as further described below.

Upon execution of a query, metadata concerning the results are forwarded to query statistics 1050 which can be used to optimize query execution plans by query planner 1030 as further described below.

Federated runtime service 1040 receives query execution plan 1039 from query planner service 1030. Query execution plan 1039 comprises a set of subplans including a root subplan and a set of branch subplans that correspond to sub-queries or implement optimizations as further described below. The root subplan and additional subplans are executed by federation runtime 1040 and/or runtimes 1060. For example, it can execute a plan that includes a first subplan that is to be executed by federation runtime 1040 and additional subplans for execution by one of runtimes 1060. Runtimes 1060 comprise runtimes 1061-1069, each being specific to a corresponding data store 1091-1099. Runtimes 1060 can execute subplans and return results to federation runtime 1040, which can then integrate the results according to the root subplan or other part of the query execution plan.

Runtimes 1068 and 1069 reside with, or are integrated with, corresponding data stores 1098 and 1099 for optimized high-speed communication between the runtimes 1068, 1069 and their data stores, and are accessible by federation runtime 1040 via proxies 1088, 1089.

Data stores 1090 including data stores 1091-1099 are heterogenous and have widely varying physical and/or logical characteristics, and can also be geographically distributed and hence geographically distant from one another and/or from federation runtime 1040. Adapters 1071-1079 convert runtime read/write requests into a format understandable by the associated data store 1091-1099. For example, data stores 1095-1099 can be object stores that require read/write queries addressing objects by object identifiers or attributes, verses key-value or block numbers of other types of data stores. Data stores 1098, 1099 are cache data stores that implement high speed storage technology such as flash memory, but contain incomplete data sets using, e.g., a LRU or "least recently used" memory that is overwritten with newly retrieved memory following a cache miss.

In other instances, an object data store such as data store 1096 (data store G) can contain data that overlaps the data from key-value data store 1093 (data store C). The term, "overlapping data" herein refers to two data stores that have different sets of data, but each set includes a subset in common with a subset of the other data store. Thus, while the two data stores can serve a unique purpose and therefore store different sets of data, or store similar data differently, it is possible to find certain data in either data store as described above with reference to FIGS. 5A-5F.

Optimization

Figure 11:
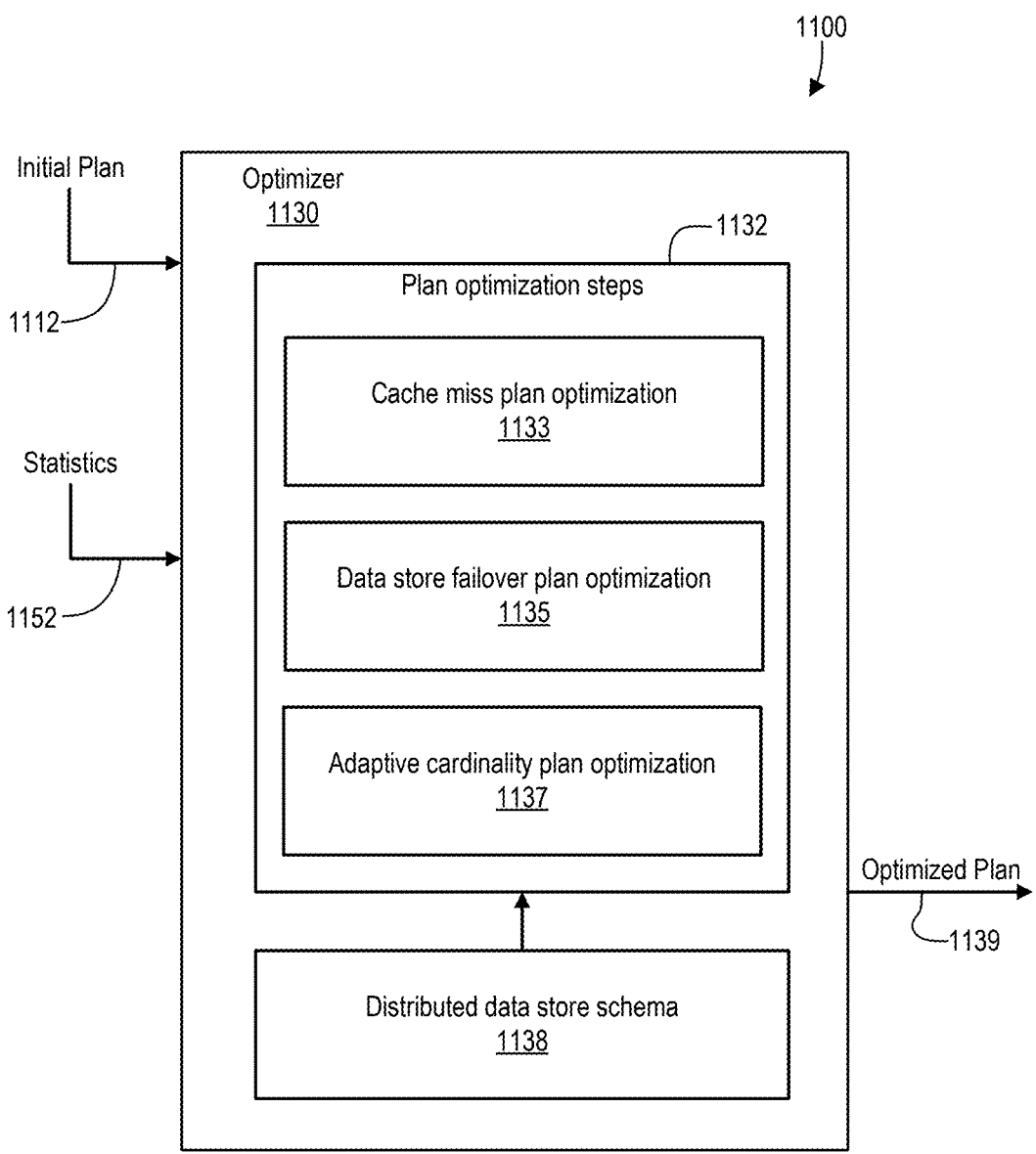
FIG. 11 illustrates a block diagram of an exemplary query planner suitable for carrying out execution plan optimizations as further described herein.

FIG. 11 shows a block diagram 1100 illustrating by way of example inputs and outputs of an query or plan optimizer 1130. Optimizer can be implemented as part of query execution engine 110 shown in FIG. 1, within query planner 1030 or federation runtime 1040 shown in FIG. 10, or distributed across a combination of the query planner 1030 and federation runtime 1040. Optimizer 1130 receives an initial plan 1112 and, in certain embodiments, query statistics 1152, and outputs an optimized plan 1139. Optimizer 1130 performs one or more plan optimization steps 1132 on an input query execution plan and operations thereon to improve performance and/or robustness.

Plan optimization steps 1132 include cache miss plan optimization 1133, data store failover plan optimization 1135, and adaptive cardinality plan optimization 1137. Distributed data store schema 1138 can be the same as query planning schemas 120 shown in FIG. 1, but are shown again here to illustrate that the schemas can also be used by plan optimization steps 1132 as further described below.

Plan optimization steps 1132 can be performed as part of the generation of physical query execution plans 150 shown in FIG. 1 and described above. In this case, query execution engine 114, in the course of generating plans 150, will apply cache miss plan optimization 1133, data store failover plan optimization 1135, and adaptive cardinality plan optimization 1137 to improve the plans 150. Plan optimization steps 1132 can instead be performed as a further improvement to plans 150, e.g., after selecting one of plans 150 for execution in operation 620 shown in FIG. 6.

In an example, a plan may be generated or modified to include cache miss plan optimization 1133, data store failover plan optimization 1135, or adaptive cardinality plan optimization 1137 as part of the plan itself. In this example, plan optimizations 1133, 1135, and/or 1137 are embedded into the output plan 1139 to provide improved data access speed, robustness, and network bandwidth efficiency.

FIG. 12 shows a flowchart 1200 illustrating by way of example a process for generating an optimized query execution plan from an initial execution plan. The procedure begins as shown by start block 1210 and proceeds to operation 1212 wherein input is received comprising an initial query execution plan. In operation 1214, the input is analyzed to determine if it includes a recognized pattern of operations for fetching data from a first data store. Next, in operation 1216, a presence of a condition is detected. The condition to be detected depends on the pattern recognized in operation 1214, for example. In one example, the recognized pattern is the retrieval of data from a first data store and the condition is that the sought data being retrieved is deterministic and a cache data store containing the sought data exists. In another example, the recognized pattern is the retrieval of data from a first data store and the condition is that the sought data is also available at a second data store. In yet another example, the recognized pattern is that first and second data sets are retrieved from respective first and second data stores, and the condition is that the initial query execution plan returns an intersection of the first and second data sets.

Next, in operation 1218 an output query execution plan is generated from the input, wherein the output query execution plan includes a first branch having operation for fetching a set of data from a first one of the plurality of data stores and a second execution branch having operations for fetching at least a subset of the data from a second one of the plurality of data stores. The procedure then ends as indicated by done block 1220. This high-level procedure is further explained with examples described below with reference to FIGS. 13-15.

Figure 13:
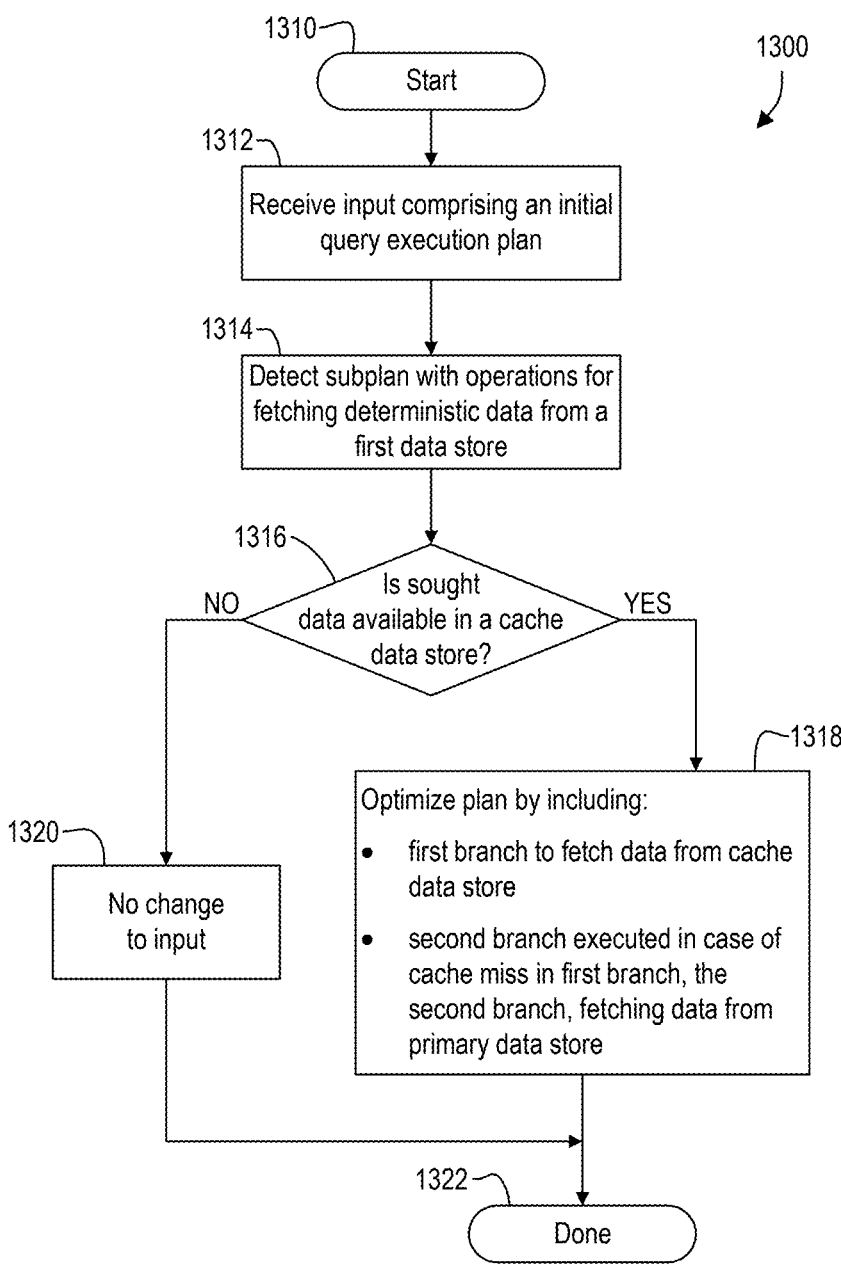
FIG. 13 shows a flow chart illustrating by way of example a method for optimizing execution plans when sought data resides in a high-speed cache data store.

FIG. 13 shows a flowchart 1300 illustrating by way of example a process for implementing cache miss plan optimization 1133 shown in FIG. 11. The method starts at "start" block 1310 and proceeds to operation 1312 wherein input is received comprising an initial query execution plan. The method proceeds to operation 1314 wherein a pattern of operations in the initial query execution plan is detected, the pattern comprising a set of operations for fetching deterministic data from a first data store. If the data is deterministic, that means that the subplan seeks a specific piece of data that is expected to exist, e.g., because it is accessed based on a known unique ID. If the data is non-deterministic, it means that it is possible that the data does not exist. Typically, if a cache contains the results of a deterministic query, additional (non-cache) data stores do not need to be checked. Thus, for this type of data, a cache can greatly increase the speed of retrieval. Non-deterministic queries still require checking the additional data store and so the use of a cache is therefore not generally going to provide a speed improvement.

The procedure then flows to operation 1316 wherein it is determined whether the data being sought in operation 1314 is available in a cache data store. For example, this can be determined by accessing the distributed data store schema 1138 discussed above with reference to FIG. 11.

If the data is available in a cache data store, then the procedure flows to operation 1318 and if not the procedure flows to operation 1320. In operation 1318, the input initial query execution plan is optimized by instantiating a first branch to fetch the data from the cache data store and a second branch for fetching the data from a primary data store in the event of a cache miss when accessing the data from the cache data store. Once the query execution is so optimized, the procedure ends as indicated by "done" block 1322.

In operation 1320, the data is not available in a cache data store, so no change to the input is needed and the procedure ends as indicated by "done" block 1322.

As mentioned above, because modern extensions to data base query languages such as SQL, such as PL/SQL, T-SQL, etc., queries, and therefore query execution plans can approach and even meet the complexity of a compete Turing machine, the procedure illustrated in flowchart 1300 can be integrated to input queries or query execution plans. To do so, the logic of flowchart 1300 is integrated into the query execution plan itself. In this instance, the query execution plan, for each data store, adds logic to check a database containing the data store schemas to determine if data being fetched is available in a cache data store and determine if the subplan associated with the data store is seeking deterministic data, and if these things are all true, then the plan will first check the cache data store for the data or else it will search a primary data store for the data.

It should be noted also that modifications to the procedure illustrated by flowchart 1300 are possible. For example, the order of operations could be modified by first checking that the sought data is available in a cache data store and then determining that the subplan is for fetching deterministic data.

The procedure illustrated by flowchart 1300 can greatly improve the speed of retrieval for deterministic data when that data is available within a cache data store, without the potential for failure of the query execution when a cache miss occurs. This is because cache data stores typically are built on high-speed storage devices, such as Flash memory devices, and because they only hold a set of recently retrieved data. Because the data set is smaller than a full data store, it is much faster to index and retrieve that data.

Figure 14:
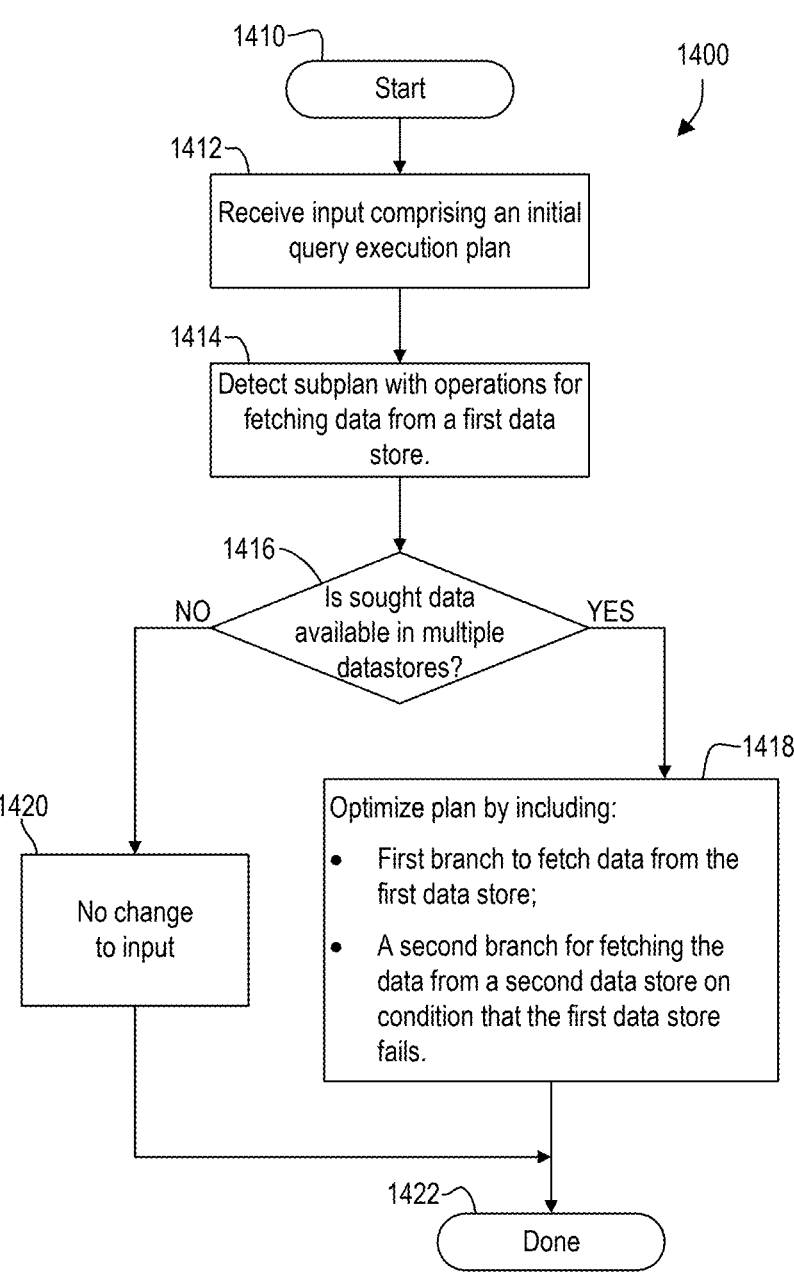
FIG. 14 shows a flow chart illustrating by way of example a method for optimizing execution plans when sought data resides in multiple data stores.

FIG. 14 shows a flowchart 1400 illustrating by way of example a method for implementing data store failover plan optimization 1135 shown in FIG. 11. The method starts at start block 1410 and proceeds to operation 1412 input comprising an initial query execution plan is received. The procedure then flows to operation 1414 wherein a subplan within the input is detected that includes operations for fetching data from a first data store. The procedure then flows to operation 1416 wherein it is determined if the sought data is available in multiple data stores. If so, the procedure flows to operation 1418. Otherwise, the procedure flows to operation 1420.

In operation 1418, the input query execution plan is optimized by instantiating therein a first branch to fetch the data from the first data store and a second branch to fetch the data from a second data store on the condition that the first data store fails. If the sought data is available in a third data store, it is also possible to add yet another conditional subplan for searching the tertiary data store in the event of failure of the second data store. A data store failure can be inferred, for example, by a timeout occurring on either a heartbeat protocol or on waiting for a response to the read/write access request sent to the first data store. It is also possible to receive an alert indicating failure of the first data store from a centralized messaging service relaying an indication of a lack of a heartbeat received from the first data store at a centralized management or monitoring station. Upon optimizing the input query execution plan as described, the method ends as indicated by "done" block 1422.

In operation 1418, no change is made when the targeted data is not available in a secondary data store, and the procedure flows to "done" block 1422 whereupon the method ends.

As discussed above with reference to flowchart 1300, the procedure illustrated in flowchart 1400 can be integrated to input queries or query execution plans. To do so, the logic of flowchart 1400 is integrated into the query execution plan itself. In this case, the query execution plan, for each data store, adds logic to check the distributed data store schema 1138 (FIG. 11) if the sought for data is available in a secondary data store and if so, the plan will first check the primary data store and then the secondary data store in case of a failure of the primary data store.

The procedure illustrated by flowchart 1400 can greatly improve the robustness of query execution by preventing or reducing instances of execution failure caused by a data store being unavailable.

Figure 15A:
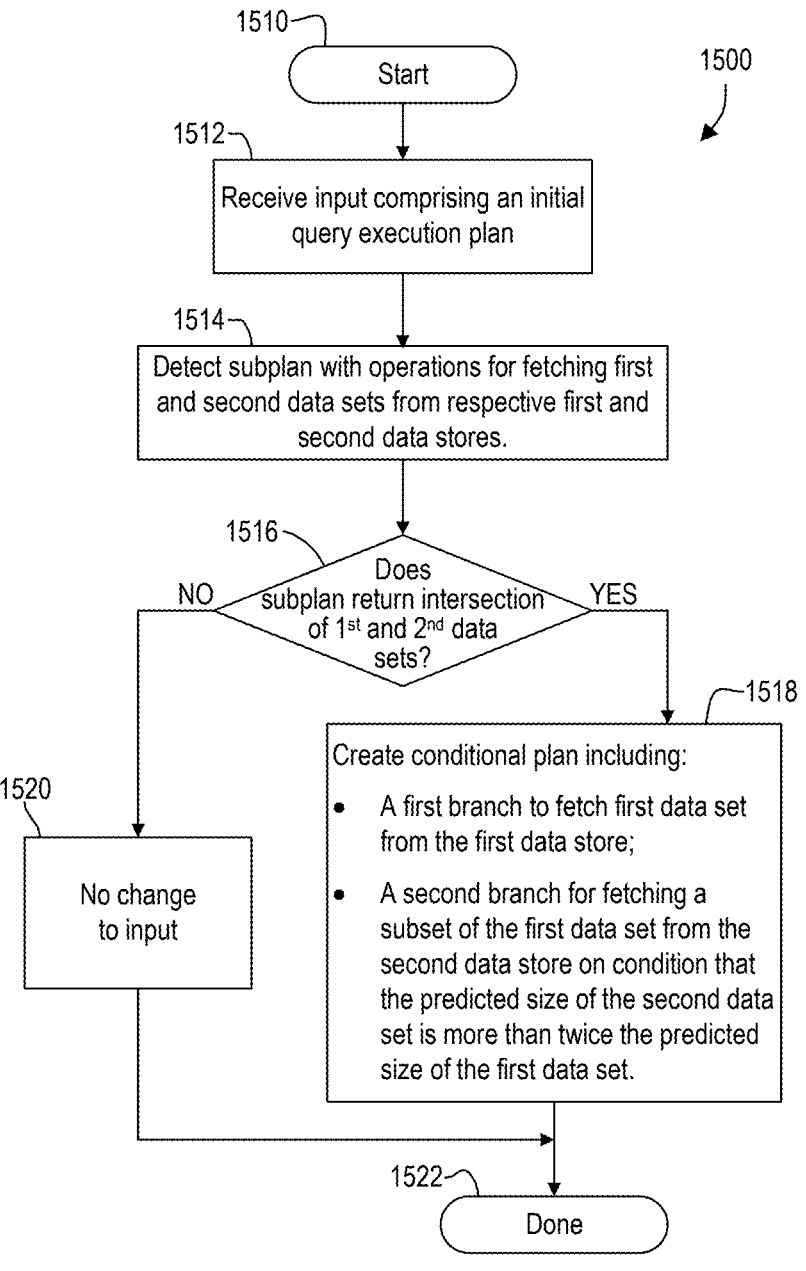
FIGS. 15A and 15B show a flow chart illustrating by way of example a method for optimizing an execution plan for certain query types.

FIG. 15A shows a flowchart 1500 illustrating by way of example a method for performing an adaptive cardinality plan optimization 1137 shown in FIG. 11. The method begins as indicated by "start" block 1510 and proceeds to operation 1512 whereupon an initial query execution plan is received. The procedure then flows to operation 1514 wherein a subplan pattern is detected in which first and second data sets are fetched from respective first and second data stores. The procedure then flows to operation 1516 wherein a condition is detected whether or not the input query execution subplan returns an intersection of the first and second data sets. If so, the procedure flows to operation 1518 and if not, the procedure flows to operation 1520.

In operation 1518, the input initial query execution plan is optimized by instantiating a first branch for fetching the first set of data from the first data store and a second branch for fetching at least a subset of the first set of data from the second data store, on the condition that a predicted size of the second data set is more than twice the predicted size of the first data set.

In one example implementation, the first data set, when it is predicted to be less than half the size of the predicted size of the second data set, is retrieved from the first data store and sent to the second data store which then takes an intersection of the first and second data sets. The second data store then returns only the intersection of the first and second data sets, which it will be understood is a subset of the first data set.

After instantiation of the first and second branches to optimize the initial query execution plan, the procedure ends as indicated by "done" block 1522.

If, at operation 1516 it is determined that the subplan does not return an intersection of the first and second data sets, the procedure flows to operation 1520 which indicates that no change is made to the input and the procedure then ends as indicated by "done" block 1522.

Figure 15B:
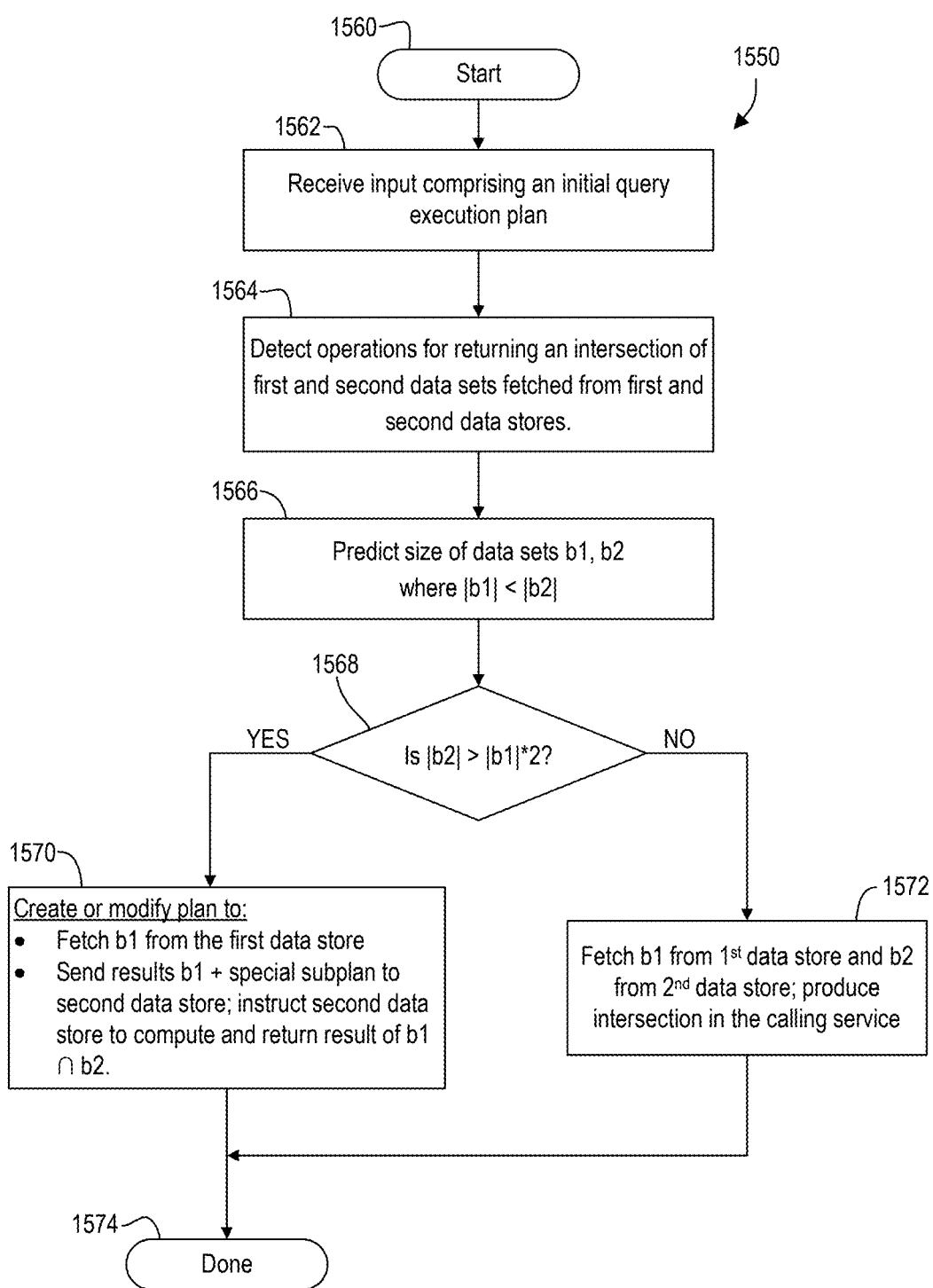

FIG. 15B shows a flowchart illustrating by way of example a refinement of the procedure described above with reference to FIG. 15A. This procedure begins with start block 1560 and proceeds to operation 1562 wherein an input comprising an initial query execution plan is received. The procedure then flows to operation 1564 in which a pattern of operations is detected in which the query requests an intersection of first and second data sets fetched from respective first and second data stores.

As an example, a person wants to host an event for local members of a management unit within a global organization. The person could generate, or cause to be generated, a query that requests email addresses for all users that are both a member of a particular management unit and reside in a particular geographical area. In this case, one subquery could, from a first data store, retrieve a first set of user identities containing all users associated with a particular management unit, and a second subquery, from a second data store, retrieve a second set of user identities for all users that reside in a the local geographical region, and then take the intersection of these two groups in order to only return identities of members of both sets. That is, the query could require that the returned set of email addresses include email addresses for only those users that belong to both the first and second sets. Upon identification of such a pattern the procedure flows to operation 1566.

In operation 1566, for each of the two subqueries or subplans identified in operation 1564, the size of the result set for each is predicted. The prediction can be based, for example, on historical query statistics collected in query statistics database 1050 described above with reference to FIG. 10. Query statistics 1050 are collected from results of previously executed query execution plans and subplans, and can include various meta data associated with the results from those executions. The statistics can be of arbitrary granularity, based on policies that are predefined or configured by an administrator. For example, statistics are collected on a per-relationship type for an entire tenant, or an entire group (within a tenant) or the entire service (across tenants). For a query discussed above, the average management unit size (of a particular type) is 10 individuals. Alternatively, statistics can be collected individually so that the last time a person queried for the members of that particular group, it contained 15 individuals, and because management units do not change often or by much at a time, it is reasonable to predict that it contains 15 members. More fined-grained data collection will result in a larger set of query statistics, and the larger the query statistics database, the greater expense in storing and maintaining that data and the more latency that would be introduced in retrieving that data. Furthermore, heuristics can also play a role in predicting a size of a result set. For example, it can be assumed that each user has only one email address.

In operation 1566, a prediction is computed for the size of the first and second data sets. For the purpose of discussion, the smaller of the two data sets is referred to herein as "b1" and the larger of the two data sets is referred to herein as "b2." To compute the predicted size of b1 and b2, query statistics 1050 (FIG. 10), are checked to see if they include historical records of previous executions of subqueries seeking the same result sets b1 or b2, or if it contains summary metadata for the result sets b1, b2. Summary metadata can be used to predict, or estimate, the sizes of b1 and b2, referred to herein as |b1| and |b2|, respectively. Once a prediction for |b1| and |b2| is determined, the procedure flows to operation 1568. If query statistics database 1050 does not include statistics for b1 and/or b2, or summary data therefor, then an estimate based on other data can be used, or heuristics can be relied upon, or the procedure can flow (not shown) to operation 1572.

In operation 1568, it is determined whether b2 is predicted to have more than twice the number of members as the predicted number of members of b1. In other words, this checks to see if $|b2|>|b1|*2$. If true, then the procedure flows to operation 1570; otherwise, the procedure flows to operation 1572.

In operation 1570, the input initial query execution plan is modified to first search for the result set b1 in the first data store, and then send that result set along with a special subplan to the runtime (e.g., runtimes 1060 shown in FIG. 10) associated with the second data store. The runtime then processes the special subplan to search for b2 and then take the intersection b1∩b2, and return that result set. The benefits of this operation are described below with reference to FIGS. 16A-16C.

Figure 16A:
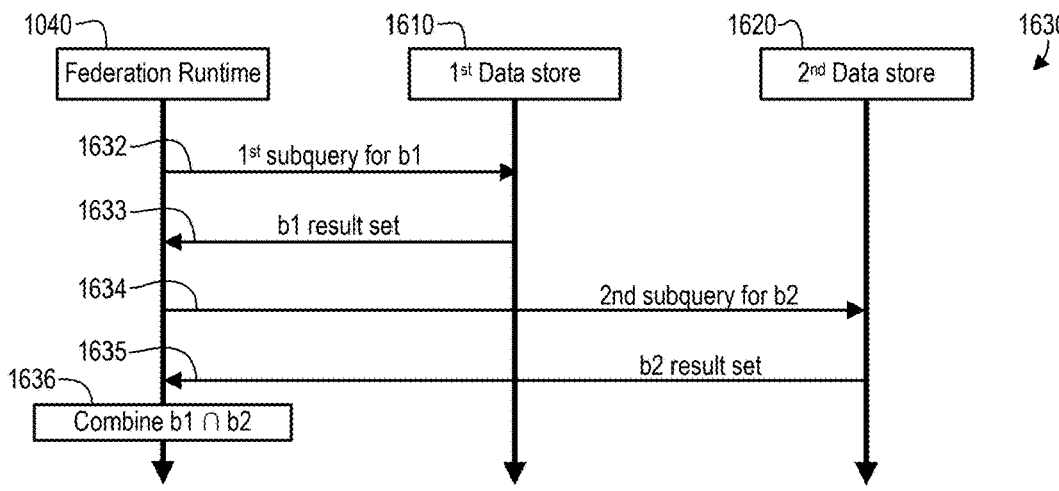
FIGS. 16A, 16B, and 16C show time-space diagrams illustrating different query optimization techniques.
Figure 16B:
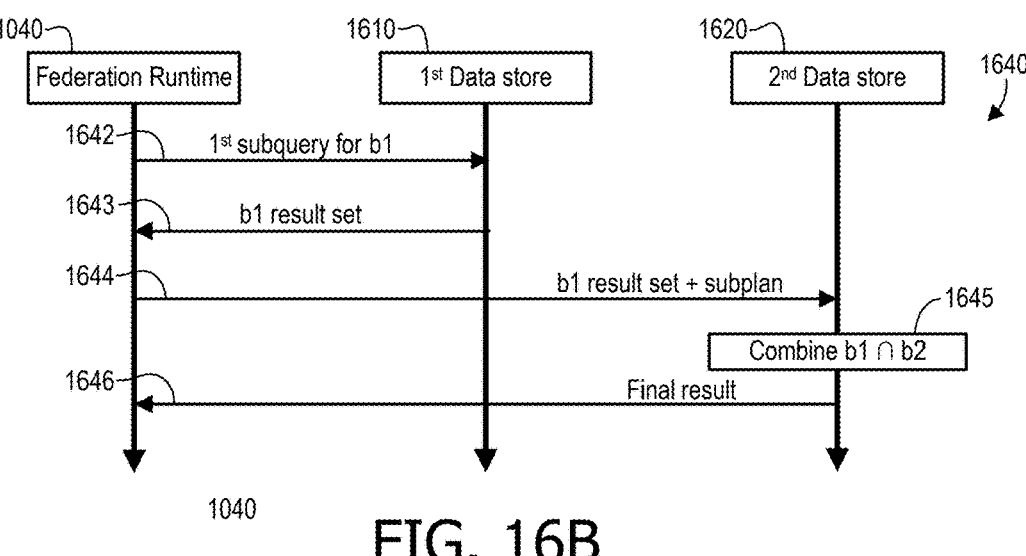
Figure 16C:
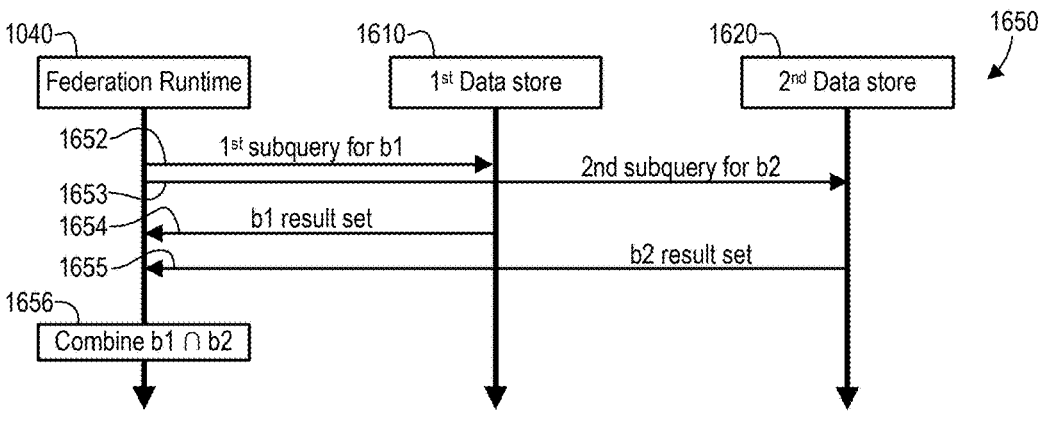

FIGS. 16A-16C show several possible strategies for combining a first set b1 with a second set b2, where b1 is retrieved from a first data store 1610 and b2 is retrieved from a second data store 1620.

Strategy 1630 shown in FIG. 16A shows a naive approach wherein a first subquery or subplan for b1 is executed by operation 1632 to retrieve b1 from first data store 1610 and then result set b1 1633 is retrieved. Then a second subquery or subplan for b2 is executed in operation 1634 to retrieve b2 from second data store 1620, resulting in receipt 1635 of the b2 result set. Then, at federation runtime 1040 (or other calling entity) the two data sets b1 and b2 are conflated to determine b1∩b2 in operation 1636, which can be returned to the requestor or else further combined according to the initial query execution plan. This plan is inefficient for two reasons. First, the entirety of data sets b1 and b2 are retrieved over the network even though only an intersection between the two is actually needed. Second, since the queries are performed synchronously, there is a time delay before executing the second subquery.

In a second strategy 1640 illustrated in FIG. 16B, the network bandwidth is minimized, which also minimizes query execution time since it takes less time to transfer less data via the network. In this case, federation runtime 1040 executes a first subquery in operation 1642 for result set b1 from first data store 1610, and retrieves same in operation 1643. Next, instead of simply retrieving result set b2 from second data store 1620, the result set b1 is sent in operation 1644 along with a special subplan to the runtime associated with second data store 1620. The runtime executes in operation 1645 the special subplan to retrieve result set b2 and compute the intersection b1∩b2, and then only returns the computed intersection to federation runtime 1040 in operation 1646. The network bandwidth consumed retrieving result sets is equal to the number of members times a constant number incorporating the number of bytes per member and some expected protocol overhead. Roughly speaking, the data consumed in strategy 1630 is C ($|b1|+|b2|$), or the sum of the sizes of each result set, times a constant C. Calculating consumed bandwidth for strategy 1640 results in C(2*$|b1|+|b1∩b2|$), or two times the size of b1 plus the size of the intersection of b1 and b2 times the constant C. In many cases where $|b2|$ is much larger than $|b1|$, the amount of data transferred over the network will be much less, and hence a much faster response to the query as a whole.

Consider the previously described example where a person wants to hold an event for local members of a management unit within a large global organization. Assume there are 15 individuals in the management unit and 1,500 employees local to the person. With strategy 1630, the first subquery for the 15 unit members is retrieved as b1 and the second subquery for the 1,500 local employees is retrieved as b2. 1,515 records are therefore received over the network. In contrast, with strategy 1640, 15 unit members are retrieved as b1, and then transmitted to the second data store along with a special subplan. The second data store then identifies which of those 15 unit members are local employees. Say there are 10 local employee members of the 15-person group so that $|b1∩b2|=10$. The final result provided in operation 1646 is only 10 members and so the total number sent over the network is 15*2 (because it is first received from first data store and then send to second data store)+10, the size of the result set b1∩b2. Therefore only 40 records, as opposed to 1,515 records, are communicated over the network with strategy 1640 as opposed to strategy 1630. Since communicating 40 records takes much less time than communicating 1,515 records, it should be understood that in this scenario, strategy 1640 takes much less time than strategy 1630.

An alternate strategy 1650 is illustrated in FIG. 16C. This strategy has the same network consumption as strategy 1630 of FIG. 16A, but has reduced latency since first and second subqueries are executed asynchronously in operations 1652 and 1653. Remaining operations 1654, 1655, and 1656 are similar as in strategy 1630, but since query executions are asynchronous, the result sets are likely to be returned more quickly.

Returning now to operation 1570 in FIG. 15B, based on the predicted size of set b2 being more than twice the predicted size of set b1, its determined that strategy 1640 shown in FIG. 16B would be faster than alternate strategies due to reduced network bandwidth consumption, which would be the dominate cause of delay. Therefore, the input initial query execution plan is modified with a procedure to first fetch b1 from the first data store, then send it and a special subplan to the runtime associated with the second data store, which then returns to the federation runtime (1040 in FIG. 10) (or other calling entity) the resulting intersection b1∩b2. The procedure then flows to "done" block 1574 to complete the procedure.

In instances where the predicted size of b2 is not greater than two times the predicted size of b1, i.e., where the result from operation 1516 is "no," the procedure flows to operation 1572 wherein b1 is fetched from the first data store and b2 is fetched from the second data store, and the calling service (e.g., federation runtime 1040) produces the intersection. The procedure then ends with "done" bock 1574.

As discussed above with reference to flowcharts 1300 and 1400, the procedure illustrated in flowcharts 1500 and 1550 can be integrated to input queries or query execution plans. To do so, the logic of flowcharts 1500 or 1550 is integrated into the query execution plan itself. In this case, the query execution plan, for each intersection operation, adds logic to check whether the predicted size of the one of the sets being intersected is more than twice the predicted size of the other set being intersected. If so, then the logic of the query execution plan checks to see that the first and second sets are being retrieved from different data stores, and if so, then the plan's logic selects an execution branch of the plan wherein the smaller result set is fetched first and then sent to the runtime associated with the data store containing the larger result set, with an instruction to return the intersection of the two sets. If one of the predicted result set sizes is not more than twice the predicted result set of the other, than a second execution branch of the plan would be selected by the plan logic in which case both result sets are fetched asynchronously and combined by the federation runtime.

It should be noted that various modifications to the procedure illustrated by flowcharts 1500 and 1550 are possible. For example, a provision is added to determine an intersection of three or more sets, with corresponding optimizations. For example, if there are three sets being intersected as b1∩b2∩b3, then the smallest b1 is compared with the largest b3 to determine if |b3| is more than twice the size of |b1| and, if so, the intersection of b1∩b3 is performed according to strategy 1640 of FIG. 16B. Then the intersection of the resulting set with b2 is taken, and the same comparison and operation is performed on the intersection of (b1∩b3)∩b2, but of course this time the true size of the intersection b1∩b3 is obtained so a prediction thereof is not needed. If additional sets are being intersected, then the next set for comparison can always be the largest one with the assumption that the most recently completed intersection will be a small set.

The procedure illustrated by flowchart 1500 can greatly reduce network bandwidth and therefore improve performance of query executions as described above with reference to FIG. 16B.

Additional Examples

An example system for optimizing an initial query execution plan comprises: a processor; a computer-readable storage medium storing instructions that are operative upon execution by the processor to perform a method, the method comprising: identifying a set of operations in the initial query execution plan that conform to a recognized pattern of operations, the pattern including fetching a set of data from one of a plurality of data stores; detecting a presence of a condition; and in response to the identifying the set of operations and the detecting of the presence of the condition, creating, from the initial query execution plan, an optimized query execution plan by replacing the operations with a new set of operations comprising a first execution branch and a second execution branch, the optimized query execution plan being configured to execute at least one of the first and second execution branches, wherein: the first execution branch comprises first operations for fetching the set of data from a first one of the plurality of data stores; and the second execution branch comprises second operations for fetching at least a subset of the data from a second one of the plurality of data stores.

An example computerized method for optimizing an initial query execution plan for a federated database comprises: identifying a set of operations in the initial query execution plan that conform to a recognized pattern of operations, the pattern including fetching a set of data from one of a plurality of data stores; detecting a presence of a condition; and in response to the identifying the set of operations and the detecting of the presence of the condition, creating, from the initial query execution plan, an optimized query execution plan by replacing the operations with a new set of operations comprising a first execution branch and a second execution branch, the optimized query execution plan being configured to execute at least one of the first and second execution branches, wherein: the first execution branch comprises first operations for fetching the set of data from a first one of the plurality of data stores; and the second execution branch comprises second operations for fetching at least a subset of the data from a second one of the plurality of data stores.

An example computer storage device has computer-executable instructions stored thereon, which, on execution by a computer, cause the computer to perform operations for optimizing an initial query execution plan for a federated database, the operations comprising: identifying a set of operations in the initial query execution plan that conform to a recognized pattern of operations, the pattern including fetching a set of data from one of a plurality of data stores; detecting a presence of a condition; and in response to the identifying the set of operations and the detecting of the presence of the condition, creating, from the initial query execution plan, an optimized query execution plan by replacing the operations with a new set of operations comprising a first execution branch and a second execution branch, the optimized query execution plan being configured to execute at least one of the first and second execution branches, wherein: the first execution branch comprises first operations for fetching the set of data from a first one of the plurality of data stores; and the second execution branch comprises second operations for fetching at least a subset of the data from a second one of the plurality of data stores.

An example computer storage device has computer-executable instructions stored thereon, which, on execution by a computer, cause the computer to perform operations for optimizing an initial query execution plan for a federated database, the operations comprising: receiving input comprising an initial query execution plan; detecting in the initial query execution plan operations for fetching first data from a first data store, for fetching second data from a second data store, and for returning an intersection of the first data and the second data; in response to the detecting: predicting a size of the first data and a size of the second data, wherein the size of the first data is less than the size of the second data; and determining if the predicted size of the second data is more than twice the predicted size of the first data; and in response to the determining that the predicted size of the second data is more than twice the predicted size of the first data, executing, in an optimized query execution plan generated from the initial query execution plan: operations for fetching the first data from the first data store; operations for sending to the second data store the first data and a subplan, the subplan causing the second data store to fetch the second data, compute an intersection of the first data and the second data, and return the intersection of the first and the second data.

Alternatively, or in addition to the other examples described herein, examples include any combination of the following:

the pattern including fetching the set of data comprises fetching deterministic data from the data store; the condition is that the data store is a cache data store; the first operations comprise operations that fetch the data from the data store; and the second operations comprise operations executed only when a cache miss results from the first operations, the second operations fetching the data from the second data store, the second data store being a non-cache data store.

the pattern including fetching the set of data comprise fetching deterministic data from the data store; the condition is that a cache data store exists for the data; the first operations comprise operations that fetch the data from the cache data store; and the second operations comprise operations executed only when a cache miss results from the first operations, the second operations fetching the data from the data store.

the condition is a determination that at least one additional data store maintains a copy of the data; the first operations comprise operations for fetching the data from the one of the plurality of data stores; and the second operations, executed only in an event of a failure of the one of the data stores, comprise operations for fetching data from the additional data store.

wherein the optimized query execution plan executes the first execution branch only upon a determination that the one of the plurality of data stores is available.

the pattern including fetching the set of data comprises fetching first data from a first data store and fetching second data from a second data store; the condition comprises detection in the initial query execution plan a computation of an intersection of the first and the second data; the optimized query execution plan predicts a size of the first data and a size of the second data and the second branch is executed only when the predicted size of the second data larger than twice the predicted size of the first data; the first operations comprise operations for fetching the first data from the first data store; and the second operations comprise operations for sending the first data and a subplan to the second data store, the subplan causing the second data store to fetch the second data, compute an intersection between the first data and the second data, and return the intersection.

wherein the predicting of the size of the first data and the size of the second data, and the determining if the predicted size of the second data is more than twice the predicted size of the first data occur at runtime upon execution of the optimized query execution plan, the optimized query execution plan comprising: a first branch executed only when the predicted size of the second data is determined to be more than twice the predicted size of the first data, the first branch including the operations for performing the operations for fetching and the operations for sending; and a second branch executed only when the predicted size of the second data is not determined to be more than twice the predicted size of the first data, the second branch comprising operations to fetch the first data from the first data store and the second data from the second store independently from each other and asynchronously.

Example Operating Environment

FIG. 17 is a block diagram of an example computing device 1700 (e.g., a computer storage device) for implementing aspects disclosed herein, and is designated generally as computing device 1700. In some examples, one or more computing devices 1700 are provided for an on-premises computing solution. In some examples, one or more computing devices 1700 are provided as a cloud computing solution. In some examples, a combination of on-premises and cloud computing solutions are used. Computing device 1700 is but one example of a suitable computing environment and is not intended to suggest any limitation as to the scope of use or functionality of the examples disclosed herein, whether used singly or as part of a larger set.

Neither should computing device 1700 be interpreted as having any dependency or requirement relating to any one or combination of components/modules illustrated. The examples disclosed herein can be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples can be practiced in a variety of system configurations, including personal computers, laptops, smart phones, mobile tablets, hand-held devices, consumer electronics, specialty computing devices, etc. The disclosed examples can also be practiced in distributed computing environments when tasks are performed by remote-processing devices that are linked through a communications network.

Computing device 1700 includes a bus 1710 that directly or indirectly couples the following devices: computer storage memory 1712, one or more processors 1714, one or more presentation components 1716, input/output (I/O) ports 1718, I/O components 1720, a power supply 1722, and a network component 1724. While computing device 1700 is depicted as a seemingly single device, multiple computing devices 1700 can work together and share the depicted device resources. For example, memory 1712 is distributed across multiple devices, and processor(s) 1014 is housed with different devices.

Bus 1710 represents one or more busses (such as an address bus, data bus, or a combination thereof). Although the various blocks of FIG. 17 are shown with lines for the sake of clarity, delineating various components can be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 17 and the references herein to a "computing device." Memory 1712 can take the form of the computer storage media referenced below and operatively provide storage of computer-readable instructions, data structures, program modules and other data for the computing device 1700. In some examples, memory 1712 stores one or more of an operating system, a universal application platform, or other program modules and program data. Memory 1712 is thus able to store and access data 1712$a$ and instructions 1712$b$ that are executable by processor 1714 and configured to carry out the various operations disclosed herein.

In some examples, memory 1712 includes computer storage media. Memory 1712 can include any quantity of memory associated with or accessible by the computing device 1700. Memory 1712 can be internal to the computing device 1700 (as shown in FIG. 17), external to the computing device 1700 (not shown), or both (not shown). Additionally, or alternatively, the memory 1712 can be distributed across multiple computing devices 1700, for example, in a virtualized environment in which instruction processing is carried out on multiple computing devices 1700. For the purposes of this disclosure, "computer storage media," "computer-storage memory," "memory," and "memory devices" are synonymous terms for the computer-storage memory 17012, and none of these terms include carrier waves or propagating signaling.

Processor(s) 1714 includes any quantity of processing units that read data from various entities, such as memory 1712 or I/O components 1720. Specifically, processor(s)

1714 are programmed to execute computer-executable instructions for implementing aspects of the disclosure. The instructions can be performed by the processor, by multiple processors within the computing device 1700, or by a processor external to the client computing device 1700. In some examples, the processor(s) 1714 are programmed to execute instructions such as those illustrated in the flow charts discussed below and depicted in the accompanying drawings. Moreover, in some examples, the processor(s) 1714 represent an implementation of analog techniques to perform the operations described herein. For example, the operations are performed by an analog client computing device 1700 and/or a digital client computing device 1700. Presentation component(s) 1716 present data indications to a user or other device. Exemplary presentation components include a display device, speaker, printing component, vibrating component, etc. It should be understood that computer data can be presented in a number of ways, such as visually in a graphical user interface (GUI), audibly through speakers, wirelessly between computing devices 1700, across a wired connection, or in other ways. I/O ports 1718 allow computing device 1700 to be logically coupled to other devices including I/O components 1720, some of which can be built in. Example I/O components 1720 include, for example but without limitation, a microphone, joystick, game pad, satellite dish, scanner, printer, wireless device, etc.

Computing device 1700 can operate in a networked environment via the network component 1724 using logical connections to one or more remote computers. In some examples, the network component 1724 includes a network interface card and/or computer-executable instructions (e.g., a driver) for operating the network interface card. Communication between the computing device 1700 and other devices can use any protocol or mechanism over any wired or wireless connection. In some examples, network component 1724 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1724 communicates over wireless communication link 1726 and/or a wired communication link 1726a to a remote resource 1728 (e.g., a cloud resource) across network 1730. Various different examples of communication links 1726 and 1726a include a wireless connection, a wired connection, and/or a dedicated link, and in some examples, at least a portion is routed through the internet.

Although described in connection with an example computing device 1700, examples of the disclosure are capable of implementation with numerous other general-purpose or special-purpose computing system environments, configurations, or devices. Examples of well-known computing systems, environments, and/or configurations that suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices might accept input from the user in any way, including from input devices such as a keyboard or pointing device, via gesture input, proximity input (such as by hovering), and/or via voice input.

Examples are described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform particular tasks or implement particular abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium for storing information for access by a computing device. In contrast, communication media typically embody computer readable instructions, data structures, program modules, or the like in a modulated data signal such as a carrier wave or other transport mechanism and include any information delivery media.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

In examples involving a general-purpose computer, aspects of the disclosure transform the general-purpose computer into a special-purpose computing device when configured to execute the instructions described herein.

It will be understood that the benefits and advantages described above can relate to one embodiment or to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures are implemented as software instructions encoded on a computer storage medium, in hardware programmed or designed to perform the operations, or both. For example, aspects of the disclosure are implemented as a system on a chip or other circuitry including a plurality of intercon- nected, electrically conductive elements.

The order of execution or performance of the operations in examples of the disclosure illustrated and described herein is not essential, unless otherwise specified. That is, the operations can be performed in any order, unless other- wise specified, and examples of the disclosure can include additional or fewer operations than those disclosed herein. For example, it is contemplated that executing or performing a particular operation before, contemporaneously with, or after another operation is within the scope of aspects of the disclosure.

As used herein, the term "set" is non-empty, and can also be referred to as a "group."

When introducing elements of aspects of the disclosure or the examples thereof, the articles "a," "an," "the," and "said" are intended to mean that there are one or more of the elements. The terms "comprising," "including," and "hav- ing" are intended to be inclusive and mean that there might be additional elements other than the listed elements. The term "exemplary" is intended to mean "an example of." The phrase "one or more of the following: A, B, and C" means "at least one of A and/or at least one of B and/or at least one of C." Below are specific example implementations offered here without limitation:

While the aspects of the disclosure have been described in terms of various examples with their associated operations, a person skilled in the art would appreciate that a combi- nation of operations from any number of different examples is also within scope of the aspects of the disclosure.

What is claimed is:

1. A system for optimizing an initial query execution plan for a federated database, the system comprising:
a processor;
a computer-readable storage medium storing instructions that are operative upon execution by the processor to perform a method, the method comprising:
identifying a group of operations in the initial query execution plan that conform to a recognized pattern of operations, the pattern representing fetching data from a data store;
detecting a presence of a condition; and
based on identifying the group of operations and detect- ing the presence of the condition, creating, from the initial query execution plan, an optimized query execution plan including replacing the group of operations with a new group of operations compris- ing a first execution branch and a second execution branch, the optimized query execution plan being configured to execute at least one of the first and second execution branches, wherein:
the first execution branch comprises first operations for fetching the data from a first data store; and
the second execution branch comprises second operations for fetching at least a subset of the data from a second data store.

2. The system of claim 1, wherein:
the pattern representing fetching the data comprises fetch- ing deterministic data from the data store;
the condition is that the data store is a cache data store;
the first operations comprise operations that fetch the data from the data store; and
the second operations comprise operations executed only when a cache miss results from the first operations, the second operations fetching the data from the second data store, the second data store being a non-cache data store.

3. The system of claim 1, wherein:
the pattern representing fetching the data comprise fetch- ing deterministic data from the data store;
the condition is that a cache data store exists for the data;
the first operations comprise operations that fetch the data from the cache data store; and
the second operations comprise operations executed only when a cache miss results from the first operations, the second operations fetching the data from the data store.

4. The system of claim 1, wherein:
the condition is a determination that an additional data store maintains a copy of the data;
the first operations comprise operations for fetching the data from the data store; and
the second operations, executed only in an event of a failure of the data store, comprise operations for fetch- ing data from the additional data store.

5. The system of claim 1, wherein the optimized query execution plan executes the first execution branch only upon a determination that the data store is available.

6. The system of claim 1, wherein:
the pattern representing fetching the data comprises fetch- ing first data from a first data store and fetching second data from a second data store;
the condition comprises detection in the initial query execution plan of a computation of an intersection of the first data and the second data;
the optimized query execution plan predicts a size of the first data and a size of the second data, and the second execution branch is executed only when a predicted size of the second data larger than the predicted size of the first data;
the first operations comprise operations for fetching the first data from the first data store; and
the second operations comprise operations for sending the first data and a subplan to the second data store, the subplan causing the second data store to fetch the second data, compute an intersection between the first data and the second data, and return the intersection.

7. A computerized method for optimizing an initial query execution plan for a federated database, the method com- prising:
identifying a group of operations in the initial query execution plan that conform to a recognized pattern of operations, the pattern representing fetching data from a data store;
detecting a presence of a condition; and
based on identifying the group of operations and detecting the presence of the condition, creating, from the initial query execution plan, an optimized query execution plan including replacing the group of operations with a new group of operations comprising a first execution branch and a second execution branch, the optimized query execution plan being configured to execute at least one of the first and second execution branches, wherein:

the first execution branch comprises first operations for fetching the data from a first data store; and the second execution branch comprises second operations for fetching at least a subset of the data from a second data store.

8. The method of claim 7, wherein:

the pattern representing fetching the data comprises fetching deterministic data from the data store;

the condition is that the data store is a cache data store;

the first operations comprise operations that fetch the data from the data store; and the second operations comprise operations executed only when a cache miss results from the first operations, the second operations fetching the data from the second data store, the second data store being a non-cache data store.

9. The method of claim 7, wherein:

the pattern representing fetching the data comprise fetching deterministic data from the data store;

the condition is that a cache data store exists for the data, the cache data store being the second data store;

the first operations comprise operations that fetch the data from the cache data store; and the second operations comprise operations executed only when a cache miss results from the first operations, the second operations fetching the data from the data store.

10. The method of claim 7, wherein:

the condition is a determination that an additional data store maintains a copy of the data;

the first operations comprise operations for fetching the data from the data store; and the second operations, executed only in an event of a failure of the data store, comprise operations for fetching data from the additional data store.

11. The method of claim 7, wherein the optimized query execution plan executes the first execution branch only upon a determination that the data store is available.

12. The method of claim 7, wherein:

the pattern representing fetching the data comprises fetching first data from a first data store and fetching second data from a second data store;

the condition comprises detection in the initial query execution plan of a computation of an intersection of the first and second data;

the optimized query execution plan predicts a size of the first data and a size of the second data, and the second execution branch is executed only when a predicted size of the second data is larger than the predicted size of the first data;

the first operations comprise operations for fetching the first data from the first data store; and the second operations comprise operations for sending the first data and a subplan to the second data store, the subplan causing the second data store to fetch the second data, compute an intersection between the first data and the second data, and return the intersection.

13. The method of claim 7, further comprising:

generating the initial query execution plan based on a query received from a requester;

forwarding the optimized query execution plan to a runtime;

receiving, from the runtime, results of the query; and forwarding the results to the requester.

14. A non-transitory computer storage device having computer-executable instructions stored thereon, which, on execution by a computer, cause the computer to perform operations for optimizing an initial query execution plan for a federated database, the operations comprising:

identifying a group of operations in the initial query execution plan that conform to a recognized pattern of operations, the pattern representing fetching data from a data store;

detecting a presence of a condition; and based on identifying the group of operations and detecting of the presence of the condition, creating, from the initial query execution plan, an optimized query execution plan including replacing the operations with a new group of operations comprising a first execution branch and a second execution branch, the optimized query execution plan being configured to execute at least one of the first and second execution branches, wherein:

the first execution branch comprises first operations for fetching the data from a first data store; and the second execution branch comprises second operations for fetching at least a subset of the data from a second data store.

15. The non-transitory computer storage device of claim 14, wherein:

the group of operations for fetching the data comprise fetching deterministic data from the data store;

the condition is that the data store is a cache data store;

the first operations comprise operations that fetch the data from the data store; and the second operations comprise operations executed only when a cache miss results from the first operations, the second operations fetching the data from the second data store, the second data store being a non-cache data store.

16. The non-transitory computer storage device of claim 14, wherein:

the group of operations for fetching the data comprise fetching deterministic data from the data store;

the condition is that a cache data store exists for the data;

the first operations comprise operations that fetch the data from the cache data store; and the second operations comprise operations executed only when a cache miss results from the first operations, the second operations fetching the data from the data store.

17. The non-transitory computer storage device of claim 14, wherein:

the condition is a determination that an additional data store maintains a copy of the data;

the first operations comprise operations for fetching the data from the data store; and the second operations, executed only in an event of a failure of the data store, comprise operations for fetching data from the additional data store.

18. The non-transitory computer storage device of claim 14 wherein the optimized query execution plan executes the first execution branch only upon a determination that the data store is available.

19. The non-transitory computer storage device of claim 14, wherein:

the pattern representing fetching the data comprises fetching first data from a first data store and fetching second data from a second data store;

the condition comprises detection in the initial query execution plan of a computation of an intersection of the first and second data;

the optimized query execution plan predicts a size of the first data and a size of the second data, and the second execution branch is executed only when a predicted size of the second data larger than the predicted size of the first data;

the first operations comprise operations for fetching the first data from the first data store; and the second operations comprise operations for sending the first data and a subplan to the second data store, the subplan causing the second data store to fetch the second data, compute an intersection between the first data and the second data, and return the intersection.

20. The non-transitory computer storage device of claim 14, wherein the operations further comprise:

generating the initial query execution plan based on a query received from a requester;

forwarding the optimized query execution plan to a run-time;

receiving, from the runtime, results of the query; and forwarding the results to the requester.

\* \* \* \* \*